US006588523B2

(12) United States Patent
Heimbrock et al.

(10) Patent No.: US 6,588,523 B2
(45) Date of Patent: Jul. 8, 2003

(54) STRETCHER HAVING A MOTORIZED WHEEL

(75) Inventors: Richard H. Heimbrock, Cincinnati, OH (US); Matt Webster, Cleves, OH (US); John Vogel, Columbus, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 10/022,552

(22) Filed: Dec. 17, 2001

(65) Prior Publication Data

US 2002/0043411 A1 Apr. 18, 2002

Related U.S. Application Data

(63) Continuation of application No. 09/434,948, filed on Nov. 5, 1999, now Pat. No. 6,330,926.

(60) Provisional application No. 60/154,089, filed on Sep. 15, 1999.

(51) Int. Cl.[7] .................................................. B60K 1/00

(52) U.S. Cl. ...................................... 180/65.5; 180/19.1

(58) Field of Search .............................. 280/43.17, 767; 180/11, 19.1, 19.5, 15, 65.1, 65.5

(56) References Cited

U.S. PATENT DOCUMENTS

| | | | | | |
|---|---|---|---|---|---|
| 813,213 | A | | 2/1906 | Johnson | |
| 1,598,124 | A | | 8/1926 | Evans | |
| 2,599,717 | A | | 6/1952 | Menzies | |
| 2,635,899 | A | | 4/1953 | Osbon, Jr. | |
| 2,999,555 | A | | 9/1961 | Stroud et al. | |
| 3,112,001 | A | | 11/1963 | Wise | |
| 3,304,116 | A | | 2/1967 | Stryker | |
| 3,305,876 | A | | 2/1967 | Hutt | |
| 3,380,546 | A | | 4/1968 | Rabjohn | |
| 3,404,746 | A | | 10/1968 | Slay | |
| 3,452,371 | A | | 7/1969 | Hirsch | |
| 3,544,127 | A | | 12/1970 | Dobson | |
| 3,618,966 | A | | 11/1971 | Vadervest | |
| 3,680,880 | A | | 8/1972 | Blaauw | |
| 3,802,524 | A | * | 4/1974 | Seidel | 180/6.5 |
| 3,814,199 | A | | 6/1974 | Jones | |
| 3,869,011 | A | * | 3/1975 | Jensen | 180/9.23 |
| 3,876,024 | A | | 4/1975 | Shieman et al. | |
| 3,938,608 | A | | 2/1976 | Folco-Zambelli | |
| 4,137,984 | A | | 2/1979 | Jennings et al. | |
| 4,221,273 | A | | 9/1980 | Finden | |
| 4,274,503 | A | | 6/1981 | Mackintosh | |
| 4,415,049 | A | | 11/1983 | Wereb | |
| 4,475,611 | A | | 10/1984 | Fisher | |
| 4,475,613 | A | | 10/1984 | Walker | |
| 4,566,707 | A | | 1/1986 | Nitzberg | |
| 4,614,246 | A | * | 9/1986 | Masse et al. | 180/6.5 |
| 4,646,860 | A | * | 3/1987 | Owens et al. | 180/19.2 |
| 4,759,418 | A | | 7/1988 | Goldenfeld et al. | |
| 4,811,988 | A | | 3/1989 | Immel | |
| 4,848,504 | A | * | 7/1989 | Olson | 180/19.1 |
| 4,874,055 | A | * | 10/1989 | Beer | 180/19.2 |
| 4,979,582 | A | | 12/1990 | Forster | |
| 4,981,309 | A | | 1/1991 | Froschle et al. | |
| 5,060,959 | A | | 10/1991 | Davis et al. | |
| 5,083,625 | A | * | 1/1992 | Bleicher | 180/65.1 |

(List continued on next page.)

FOREIGN PATENT DOCUMENTS

| | | |
|---|---|---|
| CA | 2010543 | 9/1990 |
| DE | 295 18 502 | 1/1997 |
| DE | 199 21 503 | 4/2000 |

(List continued on next page.)

*Primary Examiner*—Lesley D. Morris
*Assistant Examiner*—L. Lum
(74) *Attorney, Agent, or Firm*—Barnes & Thornburg

(57) ABSTRACT

A patient support apparatus for transporting a patient along a floor includes a frame, a plurality of casters coupled to the frame, a wheel supported relative to the frame and engaging the floor, and a drive assembly that operates to drive the wheel to propel the patient support apparatus along the floor.

19 Claims, 11 Drawing Sheets

U.S. PATENT DOCUMENTS

| | | | | | |
|---|---|---|---|---|---|
| 5,084,922 | A | | 2/1992 | Louit | |
| 5,094,314 | A | | 3/1992 | Hayata | |
| 5,121,806 | A | | 6/1992 | Johnson | |
| 5,156,226 | A | * | 10/1992 | Boyer et al. | 180/65.1 |
| 5,193,633 | A | * | 3/1993 | Ezenwa | 180/65.1 |
| 5,201,819 | A | | 4/1993 | Shiraishi et al. | |
| 5,222,567 | A | | 6/1993 | Broadhead et al. | |
| 5,279,010 | A | | 1/1994 | Ferrand et al. | |
| 5,293,950 | A | | 3/1994 | Marliac | |
| 5,337,845 | A | * | 8/1994 | Foster et al. | 180/11 |
| 5,348,326 | A | | 9/1994 | Fullenkamp et al. | |
| 5,358,265 | A | | 10/1994 | Yaple | |
| 5,447,317 | A | | 9/1995 | Gehlsen et al. | |
| 5,477,935 | A | | 12/1995 | Chen | |
| 5,495,904 | A | | 3/1996 | Zwaan et al. | |
| 5,526,890 | A | | 6/1996 | Kadowaki | |
| 5,535,465 | A | | 7/1996 | Hannant | |
| 5,542,690 | A | * | 8/1996 | Kozicki | 280/304.1 |
| 5,778,996 | A | * | 7/1998 | Prior et al. | 180/65.1 |
| 5,806,111 | A | * | 9/1998 | Heimbrock et al. | 5/86.1 |
| 5,826,670 | A | * | 10/1998 | Nan | 180/15 |
| 5,927,414 | A | * | 7/1999 | Kan et al. | 180/19.3 |
| 5,937,959 | A | * | 8/1999 | Fujii et al. | 180/12 |
| 5,937,961 | A | | 8/1999 | Davidson | |
| 5,944,131 | A | | 8/1999 | Schaffer et al. | |
| 5,964,313 | A | | 10/1999 | Guy | |
| 5,964,473 | A | | 10/1999 | Degonda et al. | |
| 5,971,091 | A | | 10/1999 | Kamen et al. | |
| 5,988,304 | A | | 11/1999 | Behrendts | |
| 5,996,149 | A | | 12/1999 | Heimbrock et al. | |
| 6,000,486 | A | | 12/1999 | Romick et al. | |
| 6,016,580 | A | | 1/2000 | Heimbrock et al. | |
| 6,035,561 | A | | 3/2000 | Paytas et al. | |
| 6,050,356 | A | | 4/2000 | Takeda et al. | |
| 6,070,679 | A | * | 6/2000 | Berg et al. | 180/19.2 |
| 6,076,208 | A | | 6/2000 | Heimbrock et al. | |
| 6,098,732 | A | | 8/2000 | Romick et al. | |
| 6,154,690 | A | * | 11/2000 | Coleman | 701/1 |
| 6,178,575 | B1 | | 1/2001 | Harada | |
| 6,209,670 | B1 | | 4/2001 | Fernie et al. | |

FOREIGN PATENT DOCUMENTS

| | | | |
|---|---|---|---|
| EP | 0 062 180 | A2 | 10/1982 |
| EP | 0 093 700 | | 11/1983 |
| EP | 0 329 504 | B1 | 8/1989 |
| EP | 0 352 647 | B1 | 1/1990 |
| EP | 0 403 202 | B1 | 12/1990 |
| EP | 0 420 263 | | 4/1991 |
| EP | 0 630 637 | | 12/1994 |
| EP | 0 653 341 | A1 | 5/1995 |
| EP | 0 776 637 | | 6/1997 |
| FR | 2 735 019 | | 12/1996 |
| GB | 415450 | | 8/1934 |
| GB | 2 285 393 | | 7/1995 |
| JP | 46-31490 | | 9/1971 |
| JP | 47-814 | | 8/1972 |
| JP | 47-17495 | | 10/1972 |
| JP | 47-44792 | | 6/1973 |
| JP | 48-44793 | | 6/1973 |
| JP | 48-54494 | | 7/1973 |
| JP | 48-54495 | | 7/1973 |
| JP | 49-29855 | | 8/1974 |
| JP | 51-20491 | | 2/1976 |
| JP | 53-9091 | | 1/1978 |
| JP | 53-96397 | | 8/1978 |
| JP | 56-68523 | | 6/1981 |
| JP | 56-68524 | | 6/1981 |
| JP | 56-73822 | | 6/1981 |
| JP | 57-157325 | | 10/1982 |
| JP | 57-187521 | | 11/1982 |
| JP | 59-37946 | | 3/1984 |
| JP | 59-183756 | | 10/1984 |
| JP | 59-186554 | | 10/1984 |
| JP | 60-12058 | | 1/1985 |
| JP | 60-12059 | | 1/1985 |
| JP | 60-21751 | | 2/1985 |
| JP | 60-31749 | | 2/1985 |
| JP | 60-31750 | | 2/1985 |
| JP | 60-31751 | | 2/1985 |
| JP | 60-122561 | | 7/1985 |
| JP | 60-188152 | | 9/1985 |
| JP | 60-188153 | | 9/1985 |
| JP | 61-188727 | | 11/1986 |
| JP | 62-60433 | | 4/1987 |
| JP | 64-17231 | | 1/1989 |
| JP | 2-84961 | | 3/1990 |
| JP | 4-108525 | | 9/1992 |
| JP | 6-50631 | | 7/1994 |
| JP | 6-237959 | | 8/1994 |
| JP | 7-136215 | | 5/1995 |
| JP | 8-112244 | | 5/1996 |
| JP | 8-317953 | | 12/1996 |
| JP | 9-24071 | | 1/1997 |
| JP | 9-38154 | | 2/1997 |
| JP | 9-38155 | | 2/1997 |
| JP | 10-146364 | | 6/1998 |
| JP | 10-181609 | | 7/1998 |
| JP | 10-305705 | | 11/1998 |
| JP | 12-107230 | | 4/2000 |
| JP | 2000-118407 | | 4/2000 |
| JP | 12-175974 | | 6/2000 |
| WO | 82-01313 | | 4/1982 |
| WO | WO 87/07830 | | 12/1987 |
| WO | 94/16935 | | 8/1994 |
| WO | WO 94/21505 | | 9/1994 |
| WO | WO 95/20514 | | 8/1995 |
| WO | WO 96/07555 | | 3/1996 |
| WO | WO 96/33900 | | 10/1996 |
| WO | 97/39715 | | 10/1997 |
| WO | 00/37222 | | 6/2000 |

* cited by examiner

STRETCHER HAVING A MOTORIZED WHEEL

This application is a continuation of U.S. patent application Ser. No. 09/434,948, which was filed Nov. 5, 1999, which issued on Dec. 18, 2001 as U.S. Pat. No. 6,330,926, which claims the benefit of Provisional application Ser. No. 60/154,089, filed Sep. 15, 1999, and which is hereby incorporated by reference herein.

BACKGROUND AND SUMMARY OF THE INVENTION

The present invention relates to a stretcher such as a wheeled stretcher for use in a hospital, and particularly to a wheeled stretcher having a wheel that can be deployed to contact a floor along which the stretcher is being pushed. More particularly, the present invention relates to a wheeled stretcher having a motorized wheel.

It is known to provide hospital stretchers with four casters, one at each corner, that rotate and swivel, as well as a center wheel that can be lowered to engage the floor. See, for example, U.S. patent application, Ser. No. 09/150,890, filed on Sep. 10, 1998, entitled "STRETCHER CENTER WHEEL MECHANISM", for Heimbrock et al., which patent application is assigned to the assignee of the present invention and incorporated herein by reference. Other examples of wheeled stretchers are shown in U.S. Pat. Nos. 5,806,111 to Heimbrock et al. and 5,348,326 to Fullenkamp et al., both of which are assigned to the assignee of the present invention, and U.S. Pat. Nos. 5,083,625 to Bleicher; 4,164,355 to Eaton et al.; 3,304,116 to Stryker; and 2,599,717 to Menzies. The center wheel is typically free to rotate but is constrained from swiveling in order to facilitate turning the stretcher around corners. The center wheel may be yieldably biased downwardly against the floor to permit the center wheel to track differences in the elevation of the floor. The present invention comprises improvements to such wheeled stretchers.

According to the present invention, a stretcher for transporting a patient along a floor includes a frame, a plurality of casters coupled to the frame, a wheel supported relative to the frame and engaging the floor, and a drive assembly drivingly couplable to the wheel. The drive assembly has a first mode of operation decoupled from the wheel so that the wheel is free to rotate when the stretcher is manually pushed along the floor without hindrance from the drive assembly. The drive assembly has a second mode of operation coupled to the wheel to drive the wheel and propel the stretcher along the floor.

According to still another aspect of the present invention, a stretcher for transporting a patient along the floor includes a frame, a plurality of casters coupled to the frame, a wheel coupled to the frame and engaging the floor, a push handle coupled to the frame to maneuver the stretcher along the floor, a drive assembly selectively couplable to the wheel and being operable to drive the wheel and propel the stretcher along the floor, and a hand control coupled to a distal end of the push handle to operate the drive assembly.

In accordance with a further aspect, the drive assembly includes a motor having a rotatable output shaft, a belt coupled to the output shaft and the wheel, and a belt tensioner movable to tension the belt so that the belt transfers rotation from the output shaft to the wheel.

According to a still further aspect, the belt tensioner includes a bracket, an idler coupled to the bracket, and an actuator coupled to the idler bracket. Illustratively, the actuator has a first orientation in which the idler is spaced apart from or lightly contacting the belt, and a second orientation in which the idler engages the belt to tension the belt to transfer rotation from the drive motor to the wheel.

In accordance with another embodiment of the drive assembly, the wheel is mounted directly on an output shaft of a drive motor. In accordance with still another embodiment of the drive assembly, the wheel is mounted directly on a rim portion of a rotor of a drive motor.

In accordance with another aspect, the stretcher further includes a battery supported on the frame and an on/off switch coupled to the drive motor and the actuator. The on/off switch has an "on" position in which the drive motor and the actuator are supplied with electrical power, and an "off" position in which the drive motor and the idler bracket actuator are prevented from receiving electrical power.

In accordance with still another aspect, the second mode of operation of the drive assembly includes a forward mode in which the drive assembly is configured so that the wheel is driven in a forward direction, and a reverse mode in which the drive assembly is configured so that the wheel is driven in a reverse direction. Illustratively, movement of a control to a forward position configures the drive assembly in the forward mode, and to a reverse position configures the drive assembly in the reverse mode. In one embodiment, the control includes a rotatable switch coupled to a distal end of a push handle, and which is biased to a neutral position between the forward position and the reverse position. In another embodiment, the control includes a push-type switch coupled to a distal end of a push handle to control the speed of the drive motor, and a forward/reverse switch located on the stretcher to control the direction of rotation of the drive motor.

According to another aspect of the invention, a stretcher for transporting a patient along a floor includes a frame, a plurality of casters coupled to the frame, a first assembly coupled to the frame for rotatably supporting a wheel between a first position spaced apart from the floor and a second position engaging the floor, a selectively engagable clutch configured to selectively couple a drive motor to the wheel when the clutch is engaged. Illustratively, the clutch allows the wheel to rotate freely when the stretcher is manually pushed along the floor without hindrance from the drive motor when the wheel is engaging the floor and the clutch is disengaged. On the other hand, the drive motor drives the wheel to propel the stretcher along the floor when the wheel is engaging the floor and the clutch is engaged.

Additional features of the present invention will become apparent to those skilled in the art upon a consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

The present invention will be described in conjunction with a hospital stretcher, but it will be understood that the same may be used in conjunction with any patient support apparatus, such as an ambulatory chair.

Figure 1A:
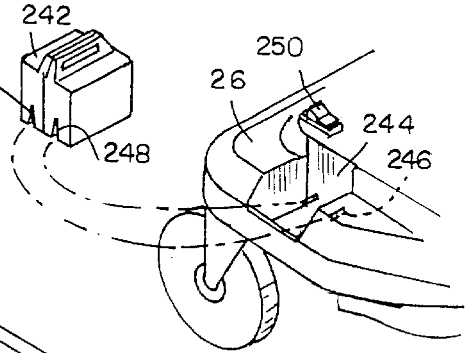
FIG. 1*a* is a perspective view of a portion of the stretcher of FIG. 1, showing a rechargeable battery, a recessed battery compartment in a lower frame configured for receiving the battery and a main power switch mounted on the lower frame adjacent to the battery compartment.
Figure 1:
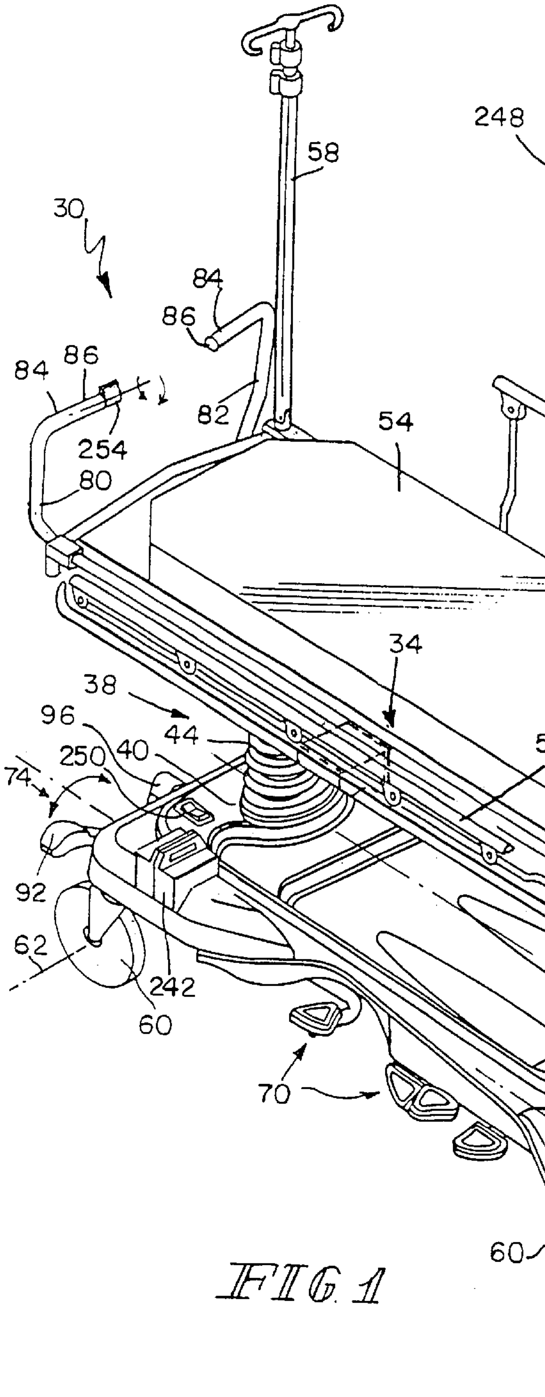
FIG. 1 is a perspective view showing a wheeled stretcher incorporating a drive assembly including a floor-engaging wheel for propelling the stretcher along a floor in accordance with the present invention.

Referring to FIG. 1, a stretcher 20 in accordance with the present invention includes a frame 22, comprising an upper frame 24 and a lower frame 26, a shroud 28 covering the lower frame 26, a head end 30, a foot end 32, an elongated first side 34, and an elongated second side 36. As used in this description, the phrase "head end 30" will be used to denote the end of any referred-to object that is positioned to lie nearest the head end 30 of the stretcher 20, and the phrase "foot end 32" will be used to denote the end of any referred-to object that is positioned to lie nearest the foot end 32 of the stretcher 20. Likewise, the phrase "first side 34" will be used to denote the side of any referred-to object that is positioned to lie nearest the first side 34 of the stretcher 20 and the phrase "second side 36" will be used to denote the side of any referred-to object that is positioned to lie nearest the second side 36 of the stretcher 20.

The upper frame 24 is movably supported above the lower frame 26 by a lifting mechanism 38 for raising, lowering, and tilting the upper frame 24 relative to the lower frame 26. Illustratively, the lifting mechanism 38 includes head end and foot end hydraulic cylinders 40 and 42, which are covered by flexible rubber boots 44. The head end hydraulic cylinder 40 controls the vertical position of the head end 30 of the upper frame 24 relative to the lower frame 26, and the foot end hydraulic cylinder 42 controls the vertical position of the foot end 32 of the upper frame 24 relative to the lower frame 26.

It is well known in the hospital equipment art to use various types of mechanical, electromechanical, hydraulic or pneumatic devices, such as electric drive motors, linear actuators, lead screws, mechanical linkages and cam and follower assemblies, to effect motion. It will be understood that the terms "drive assembly" and "linkage assembly" in the specification and in the claims are used for convenience only, and are intended to cover all types of mechanical, electromechanical, hydraulic and pneumatic mechanisms and combinations thereof, without limiting the scope of the invention.

A patient support deck 50 is carried by the upper frame 24 and has a head end 30, a foot end 32, a first elongated side 34, and a second elongated side 36. A mattress 52 having an upwardly-facing patient support surface 54 is supported by the patient support deck 50. A pair of collapsible side rails 56 are mounted to the upper frame 24 adjacent to the first and second elongated sides 34, 36 of the patient support deck 50. An IV pole 58 for holding solution containers or other objects at a position elevated above the patient support surface 54 is pivotably attached to the upper frame 24, and can be pivoted between a lowered horizontal position alongside the patient support deck 50 and a generally vertical raised position shown in FIG. 1.

Casters 60 are mounted to the lower frame 26, one at each corner, so that the stretcher 20 can be rolled over a floor 62 across which a patient is being transported. Several foot pedals 70 are pivotably coupled to the lower frame 26 and are coupled to the lifting mechanism 38 to control the vertical movement of the head end 30 and the foot end 32 of the upper frame 24 relative to the lower frame 26. In addition, a brake pedal 72 is coupled to the lower frame 26 near the foot end 32 thereof to control the braking of the casters 60. A brake-steer butterfly pedal 74 is coupled to the lower frame 26 near the head end 30 thereof to control both the braking of the casters 60, and the release of the braked casters 60. Each of the foot pedals 70, brake pedal 72, and brake-steer pedal 74 extends outwardly from the lower frame 26.

Figure 11:
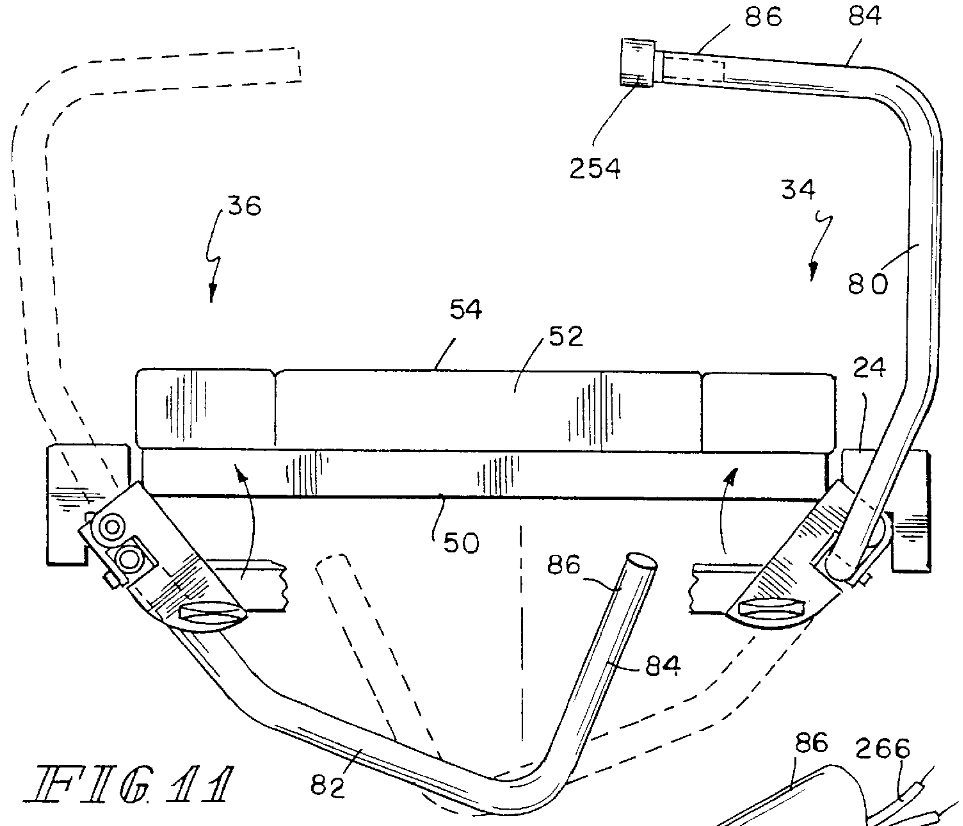
FIG. 11 is an end elevation view of the stretcher of FIG. 1, showing the head end of a patient support deck mounted on the lower frame, a first push bar locked in an upward push position and having a handle post extending generally horizontally above the patient support deck, a second push bar locked in a down-out-of-the-way position having a handle post below the patient support deck, and a rotary switch coupled to a distal end of the handle post of the first push bar for operating the drive assembly.

As shown in FIG. 11, a first push bar 80 is pivotally mounted to the head end 30 of the upper frame 24 below the patient support deck 50 adjacent to the first elongated side 34 of the patient support deck 50. Likewise, a second push bar 82 is pivotally mounted to the head end 30 of the upper frame 24 below the patient support deck 50 adjacent to the second elongated side 36 of the patient support deck 50. Each of the first and second push bars 80, 82 is independently movable between a raised push position shown in FIGS. 1 and 11, and a lowered down-out-of-the-way position shown in FIG. 11. The first and second push bars 80, 82 each include a handle post 84 that is grasped by the caregiver when the first and second push bars 80, 82 are in the raised push position to manually push the stretcher 20 over the floor 62. When the push bars 80, 82 are in the down-out-of-the-way position, the push bars 80, 82 are below and out of the way of the patient support surface 54, thus maximizing the caregiver's access to a patient on the patient support surface 54.

As previously described, the stretcher 20 includes the brake pedal 72 positioned at the foot end 32 of the stretcher 20, and the brake-steer pedal 74 positioned at the head end 30 of the stretcher 20. A brake-steer shaft 88 extends longitudinally along the length of the stretcher 20 on the first side 34 thereof underneath the shroud 28, and is connected to both the brake pedal 72 at the foot end 32 and the brake-steer pedal 74 at the head end 30. Movement of either the brake pedal 72 or the brake-steer pedal 74 by a caregiver causes the brake-steer shaft 88 to rotate about a longitudinal pivot axis 90. When the brake-steer shaft 88 is in a neutral position shown in solid lines in FIG. 4, the brake-steer pedal 74 is generally horizontal as shown in FIG. 1, and the casters 60 are free to swivel and rotate. From the generally horizontal neutral position, the caregiver can depress the brake pedal 72 or a braking portion 92 of the brake-steer pedal 74 to rotate the brake-steer shaft 88 in an anticlockwise, braking direction indicated by arrow 94 in FIG. 4 to a brake position shown in phantom in FIG. 4. In the braking position, the braking portion 92 of the brake-steer pedal 74 is angled downwardly toward the first side 34 of the stretcher 20, and a steering portion 96 of the brake-steer pedal 74 is angled upwardly. Rotation of the brake-steer shaft 88 to the brake position moves brake shoes into engagement with the casters 60 to stop rotation and swiveling movement of the casters 60.

Figure 4:
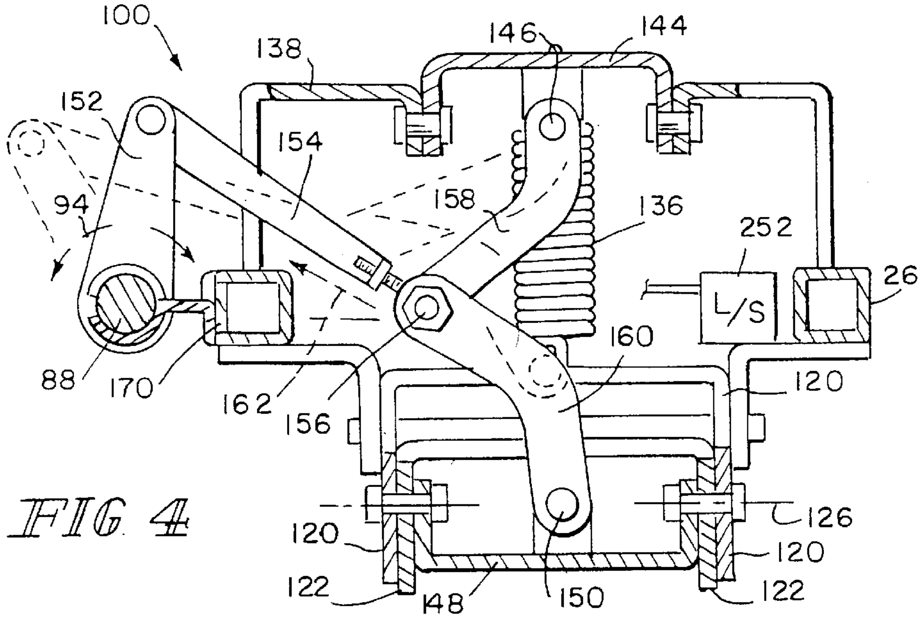
FIG. 4 is a sectional view taken along line 4—4 in FIG. 3, and showing the linkage assembly in the neutral position in which the wheel spaced apart from the floor.

From the brake position shown in phantom in FIG. 4, the caregiver can depress a steering portion 96 of the brake-steer pedal 74 to rotate the brake-steer shaft 88 in a clockwise direction back to the neutral position shown in solid lines in FIG. 4. When the brake-steer shaft 88 is in the neutral position, the caregiver can depress the steering portion 96 of the brake-steer pedal 74 to rotate the brake-steer shaft 88 in a clockwise, steering direction indicated by arrow 98 shown in FIG. 6 to a steer position shown in FIG. 6. In the steer position, the braking portion 92 of the brake-steer pedal 74 is angled upwardly, and the steering portion 96 of the brake-steer pedal 74 is angled downwardly toward the second side 36 of the stretcher 20.

A linkage assembly 100 is provided for lifting and lowering a wheel 110. The linkage assembly 100 has (i) a neutral position (shown in FIGS. 3 and 7) in which the wheel 110 is raised above the floor 62 a first distance, (ii) a brake position (shown in phantom in FIG. 4) in which the wheel 110 is raised above the floor 62 a second higher distance, and (iii) steer position (shown in FIGS. 5 and 8–10) in which the wheel 110 is engaging the floor 62. The floor-engaging wheel 110 serves a dual purpose—(a) it facilitates steering of the stretcher 20, and (b) it drives the stretcher 20 along the floor 62 in a power drive mode. Referring to FIGS. 2–6, the wheel 110 is mounted on an axle 112 coupled to the lower frame 26 by a wheel-mounting bracket 114. The wheel-mounting bracket 114 is, in turn, coupled to the brake-steer shaft 88. Rotation of the brake-steer shaft 88 changes the position of the wheel 110 relative to the floor 62. For example, when the brake-steer pedal 74 and the brake-steer shaft 88 are in the neutral position, the wheel-mounting bracket 114 holds the wheel 110 above the floor 62 a first distance (approximately 0.5 inches (1.3 cm)) as shown in FIG. 3.

When the brake-steer shaft 88 rotates in the braking direction 94 (shown in FIG. 4), the linkage assembly 100 pivots the wheel-mounting bracket 114 upwardly to further lift the wheel 110 above the floor 62 a second higher distance (approximately 3.5 inches (8.9 cm)) to allow equipment, such as the base of an overbed table (not shown), to be positioned underneath the wheel 110. When the brake-steer shaft 88 rotates in the steering direction 98 (shown in FIG. 6), the linkage assembly 100 pivots the wheel-mounting bracket 114 downwardly to lower the wheel 110 to engage the floor 62 as shown in FIGS. 5 and 8–10.

The wheel-mounting bracket 114 includes a first outer fork 120, and a second inner fork 122. A foot end 32 of the first fork 120, that is the end of the first fork 120 closer to the foot end 32 of the stretcher 20, is pivotably coupled to the lower frame 26 for pivoting movement about a first transverse pivot axis 124. A head end of the first fork 120, that is the end of the first fork 120 closer to the head end 30 of the stretcher 20, is pivotably coupled to the second fork 122 for rotation about a second transverse pivot axis 126. A head end portion 130 of the second fork 122 extends from the second transverse pivot axis 126 toward the head end 30 of the stretcher 20. The wheel 110 is coupled to the head end portion 130 of the second fork 122 for rotation about an axis of rotation 128. A foot end portion 132 of the second fork 122 extends from the second transverse pivot axis 126 toward the foot end 32 of the stretcher 20, and is received by a space formed by two spaced-apart prongs of the first fork 120.

An end plate 134 is fixed to the foot end portion 132 of the second fork 122. A vertically oriented spring 136 connects the end plate 134 to a frame bracket 138 mounted to the lower frame 26. When the wheel 110 is in the neutral position (raised approximately 0.5 inches (1.3 cm)), the brake position (raised approximately 3.5 inches (8.9 cm)), and the steer position (engaging the floor 62), the spring 136 yieldably biases the end plate 134 and the foot end portion 132 of the second fork 122 upwardly, so that the head end portion 130 of the second fork 122 and the wheel 110 are yieldably biased downwardly. The end plate 134 has a pair of transversely extending barbs 140 shown in FIGS. 3 and 5 that are appended to a lower end of the end plate 134 and that are positioned to engage the bottom of the first fork 120 when the first and second forks 120, 122 are in an "in-line" configuration defining a straight bracket as shown in FIG. 3. Thus, the barbs 140 stop the upward movement of the end plate 134 at the in-line configuration to limit the downward movement of the head end portion 130 of the second fork 122 and the wheel 110 relative to the first fork 120 as the spring 136 biases the end plate 134 of the second fork 122 upwardly.

Figure 5:
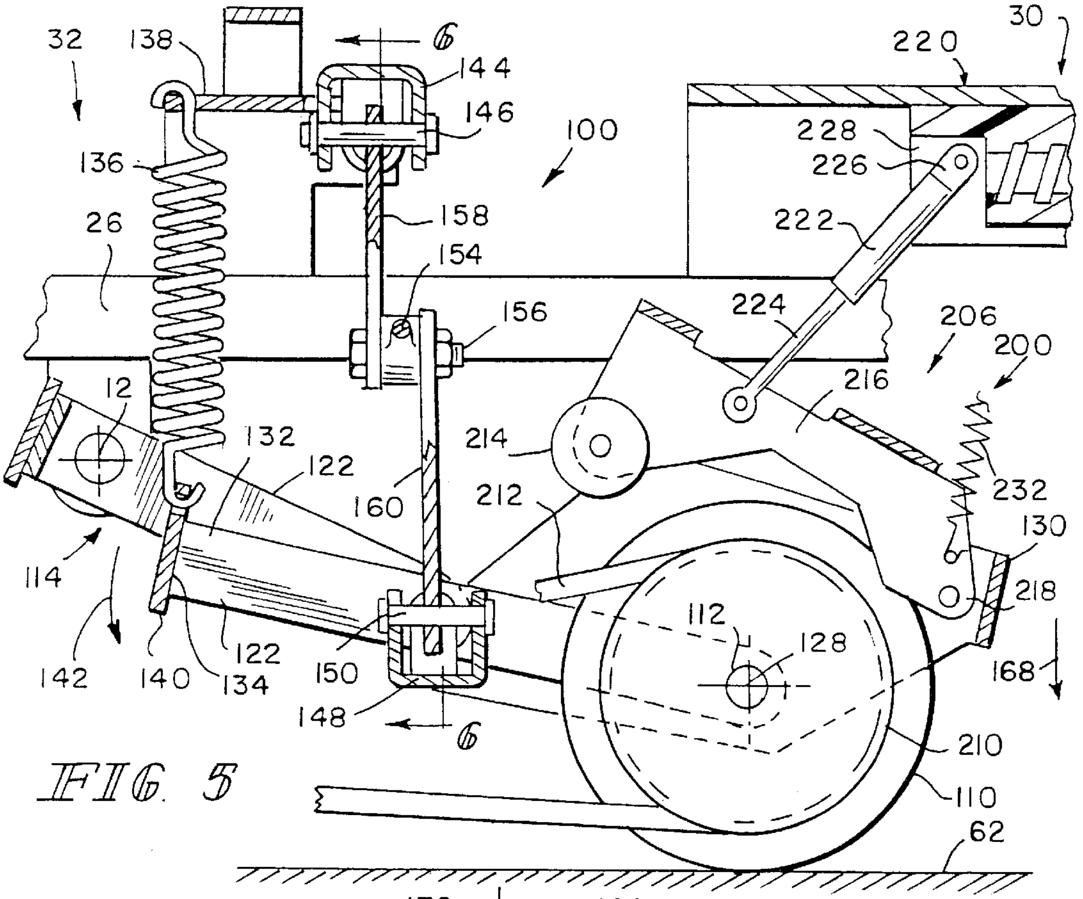
FIG. 5 is a view similar to FIG. 3, showing the linkage assembly in the steer position with the wheel engaging the floor, and further showing the actuator in the first orientation with the idler spaced apart from the belt to decouple the drive motor from the wheel so that the wheel is free to rotate when the stretcher is manually pushed along the floor without hindrance from the drive assembly.

When the brake-steer shaft 88 pivots the wheel-mounting bracket 114 downwardly to the steer position shown in FIGS. 5 and 8–10, the wheel 110 is lowered to a position engaging the floor 62. Continued downward movement of the wheel-mounting bracket 114 pivots the second fork 122 relative to the first fork 120 about the second transverse pivot axis 126 in the direction indicated by arrow 142 shown in FIG. 5, moving the first and second forks 120, 122 into an "angled" configuration as shown in FIG. 5. The end plate 134 is yieldably biased upwardly by the spring 136 to yieldably bias the wheel 110 downwardly against the floor 62. Preferably, the downward force urging the wheel 110 against the floor 62 should be sufficient to prevent the wheel 110 from sliding sideways when the stretcher 20 is turned. A spring force of approximately 40 pounds (about 18 kilograms) has been found to be adequate.

As can be seen, the spring 136 biases the second fork 122 away from the angled configuration and toward the in-line configuration, so that the wheel 110 is biased to a position past the plane defined by the bottoms of the casters 60 when the wheel 110 is lowered for engaging the floor 62. Of course, the floor 62 limits the downward movement of deployed wheel 110. However, if the floor 62 has a surface that is not planar or that is not coincident with the plane defined by the casters 60, the spring 136 cooperates with the first and second forks 120, 122 to maintain contact between the wheel 110 and the floor 62. Illustratively, the spring 136 can maintain engagement between the deployed wheel 110 and the floor 62 when the floor 62 beneath the wheel 110 is spaced approximately 1 inch (2.5 cm) below the plane defined by the casters 60. Also, the spring 136 allows the deployed wheel 110 to pass over a threshold that is approximately 1 inch (2.5 cm) above the plane defined by the casters 60 without causing the wheel 110 to move out of the steer position into the neutral position.

The linkage assembly 100 includes an upper bent-cross bracket 144 coupled to the frame bracket 138, and supporting an upper pivot pin 146. Likewise, the linkage assembly 100 includes a lower bent-cross bracket 148 coupled to the wheel-mounting bracket 114, and supporting a lower pivot pin 150. In addition, the linkage assembly 100 includes (i) a pivot link 152 fixed to the brake-steer shaft 88, (ii) a connecting link 154 extending from the pivot link 152 to a common pivot pin 156, (iii) a frame link 158 extending from the common pivot pin 156 to the upper pivot pin 146 of the upper bent-cross bracket 144, and (iv) a bracket link 160 extending from the common pivot pin 156 to the lower pivot pin 150 of the lower bent-cross bracket 148.

Figure 2:
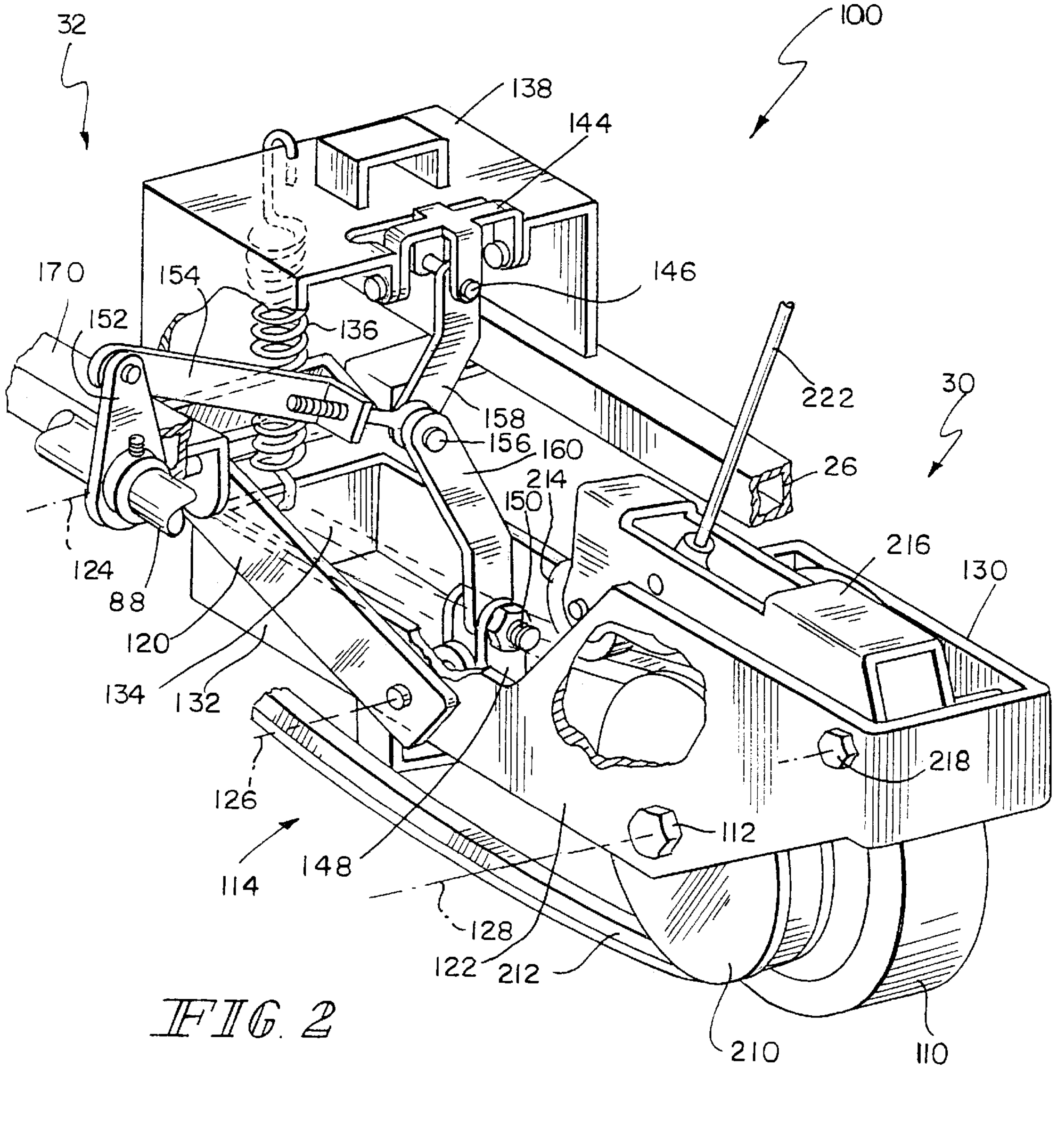
FIG. 2 is a partial perspective view, with portions broken away, showing a linkage assembly for lifting and lowering the wheel, and a drive assembly drivingly couplable to the wheel for propelling the stretcher along the floor, the linkage assembly having a neutral position (shown in FIGS. 3 and 7) in which the wheel is spaced apart from the floor and a steer position (shown in FIGS. 5 and 8) in which the wheel is engaging the floor, and the drive assembly having a first mode of operation (shown in FIGS. 5 and 8) decoupled from the wheel so that the wheel is free to rotate when the stretcher is manually pushed along the floor without hindrance from the drive assembly and a second mode of operation (shown in FIGS. 9 and 10) coupled to the wheel to drive the wheel to propel the stretcher along the floor.
Figure 3:
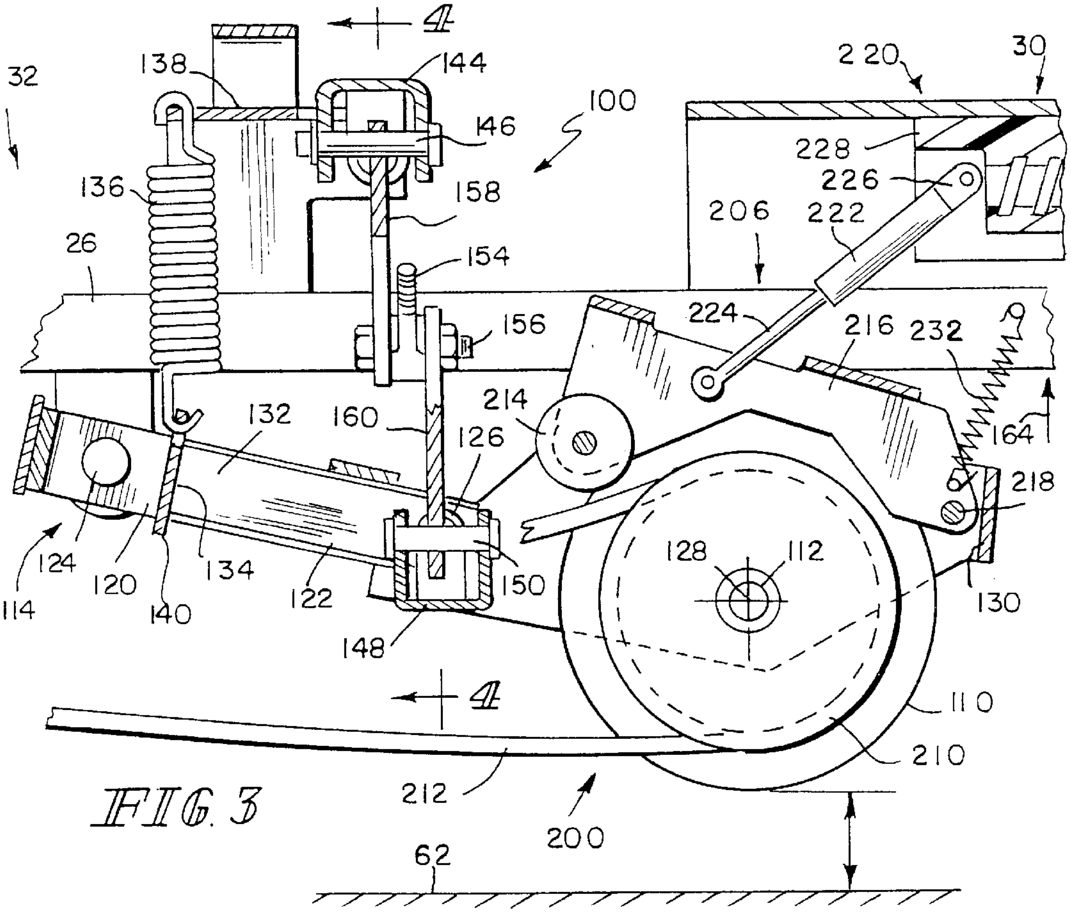
FIG. 3 is a side elevation view showing the linkage and drive assemblies of FIG. 2, the linkage assembly being shown in the neutral position with the wheel spaced apart from the floor, and further showing the drive assembly in the first mode of operation decoupled from the wheel, the drive assembly including a belt coupling a drive motor to the wheel and a belt tensioner to selectively tension the belt, the belt tensioner including a support bracket, an idler pulley (hereinafter idler) coupled to the support bracket, and an actuator having a first orientation (shown in FIGS. 3, 5, 7 and 8) in which the idler is spaced apart from the belt to decouple the drive motor from the wheel, and a second orientation (shown in FIGS. 9 and 10) in which the idler engages the belt to tension the belt to couple the drive motor to the wheel to propel the stretcher along the floor when the wheel is engaging the floor.
Figure 6:
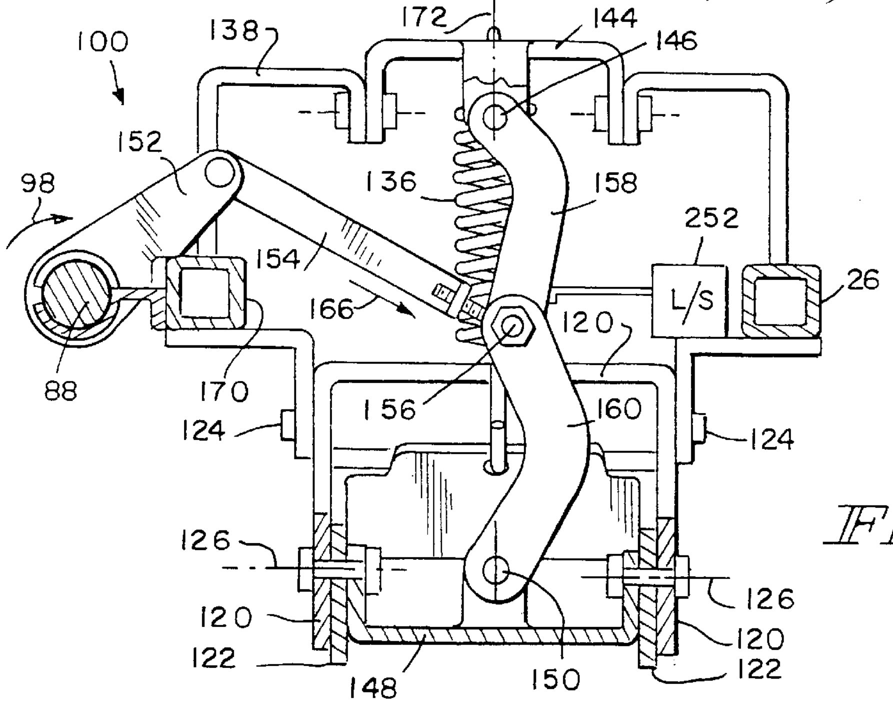
FIG. 6 is a sectional view similar to FIG. 4 taken along line 6—6 in FIG. 5, and showing the linkage assembly in the steer position in which the wheel engaging the floor.

The frame link 158 and the bracket link 160 form a scissors-like arrangement as shown in FIGS. 2, 4 and 6. When the caregiver depresses brake pedal 72 (or the braking portion 92 of the brake-steer pedal 74) and rotates the brake-steer shaft 88 in the counter-clockwise direction 94 toward the brake position, the pivot link 152 pivots away from the wheel-mounting bracket 114, pulling the connecting link 154 and the common pivot pin 156 toward the brake-steer shaft 88 in the direction indicated by arrow 162 shown in FIG. 4. The upper bent-cross bracket 144 is vertically fixed relative to the lower frame 26 and the lower bent-cross bracket 148 is fixed to the wheel-mounting bracket 114, which is pivotably mounted to the lower frame 26 for upward and downward pivoting movement relative to the lower frame 26. Movement of the common pivot pin 156 in the direction 162 closes the scissors arrangement formed by the frame link 158 and the bracket link 160 as shown in phantom in FIG. 4, pulling the bracket link 160 upwardly. Pulling the bracket link 160 upwardly pivots the wheel-mounting bracket 114 in the direction of arrow 164 shown in FIG. 3, and further lifts the wheel 110 off of the floor 62.

When the caregiver depresses the steering portion 96 of the brake-steer pedal 74 and rotates the brake-steer shaft 88 in the clockwise direction 98 (shown in FIG. 6) toward the steer position, the pivot link 152 pivots toward the wheel-mounting bracket 114 pushing the connecting link 154 and the common pivot pin 156 away from the brake-steer shaft 88 in the direction of arrow 166 shown in FIG. 6. Movement of the common pivot pin 156 in the direction indicated by arrow 166 opens the scissors arrangement formed by the frame link 158 and the bracket link 160, and pushes the bracket link 160 downwardly. Pushing the bracket link 160 downwardly pivots the wheel-mounting bracket 114 in the direction of arrow 168 shown in FIG. 5, thus deploying the wheel 110 into engagement with the floor 62.

When the brake-steer shaft 88 is in the steer position, the pivot link 152 contacts a frame member 170 coupled to the lower frame 26, stopping the brake-steer shaft 88 from further rotation in the clockwise direction as shown in FIG. 6. When the pivot link 152 contacts the frame member 170, the common pivot pin 156 is in an "over-the-center position" away from the brake-steer shaft 88 and beyond a vertical plane 172 (shown in FIG. 6) defined by the upper and lower pivot pins 146 and 150, so that the scissors arrangement formed by the frame link 158 and bracket link 160 is in a generally fully-opened position. The upward tension of spring 136 in conjunction with the over-the-center position of the common pivot pin 156 biases the pivot link 152 against the frame member 170 and biases the common pivot pin 156 away from the brake-steer shaft 88, to lock the wheel 110 and the brake-steer shaft 88 in the steer position shown in FIGS. 5 and 8–10.

Thus, the stretcher 20 includes the brake pedal 72 and the brake-steer pedal 74 connected to the longitudinally extending brake-steer shaft 88. Actuation of the brake pedal 72 or the brake-steer pedal 74 by the caregiver simultaneously controls the position of wheel 110 and the braking of casters 60. The brake-steer pedal 74 has a horizontal neutral position where the wheel 110 is at the first distance above the floor 62 and the casters 60 are free to rotate and swivel.

From the neutral position, the caregiver can push the brake pedal 72 or the braking portion 92 of the brake-steer pedal 74 down to rotate the brake-steer shaft 88 by about 30 degrees to the brake position to brake the casters 60. In addition, when the brake-steer shaft 88 rotates to the brake position, the pivot link 152 pivots away from the wheel-mounting bracket 114 pulling the connecting link 154 and the common pivot pin 156 in the direction 162 (shown in FIG. 4) and closing the scissors arrangement of the frame link 158 and the bracket link 160 to lift the wheel 110 to the second higher distance above the floor 62.

The caregiver can also push the steering portion 96 of the brake-steer pedal 74 down to rotate the brake-steer shaft 88 by about 30 degrees past the neutral position to the steer position in which the casters 60 are free to rotate and swivel. In addition, when the brake-steer shaft 88 rotates to the steer position, the pivot link 152 pivots toward the wheel-mounting bracket 114 pushing the connecting link 154 and the common pivot pin 156 in the direction 166 (shown in FIG. 6) and opening the scissors arrangement formed by the frame link 158 and the bracket link 160 to deploy the wheel 110 to engage floor 62 with enough pressure to facilitate steering of the stretcher 20. In the steer position, the second fork 122 of the wheel-mounting bracket 114 pivots relative to the first fork 120 and relative to the lower frame 26. The wheel 110 is spring-biased into engagement with the floor 62 with sufficient force to permit the wheel 110 to track differences in elevation of the floor 62. Reference may be made to the above-mentioned U.S. patent application, Ser. No. 09/150,890, entitled "STRETCHER CENTER WHEEL MECHANISM", for further description of the linkage assembly 100 for lifting and lowering the wheel 110.

Figure 7:
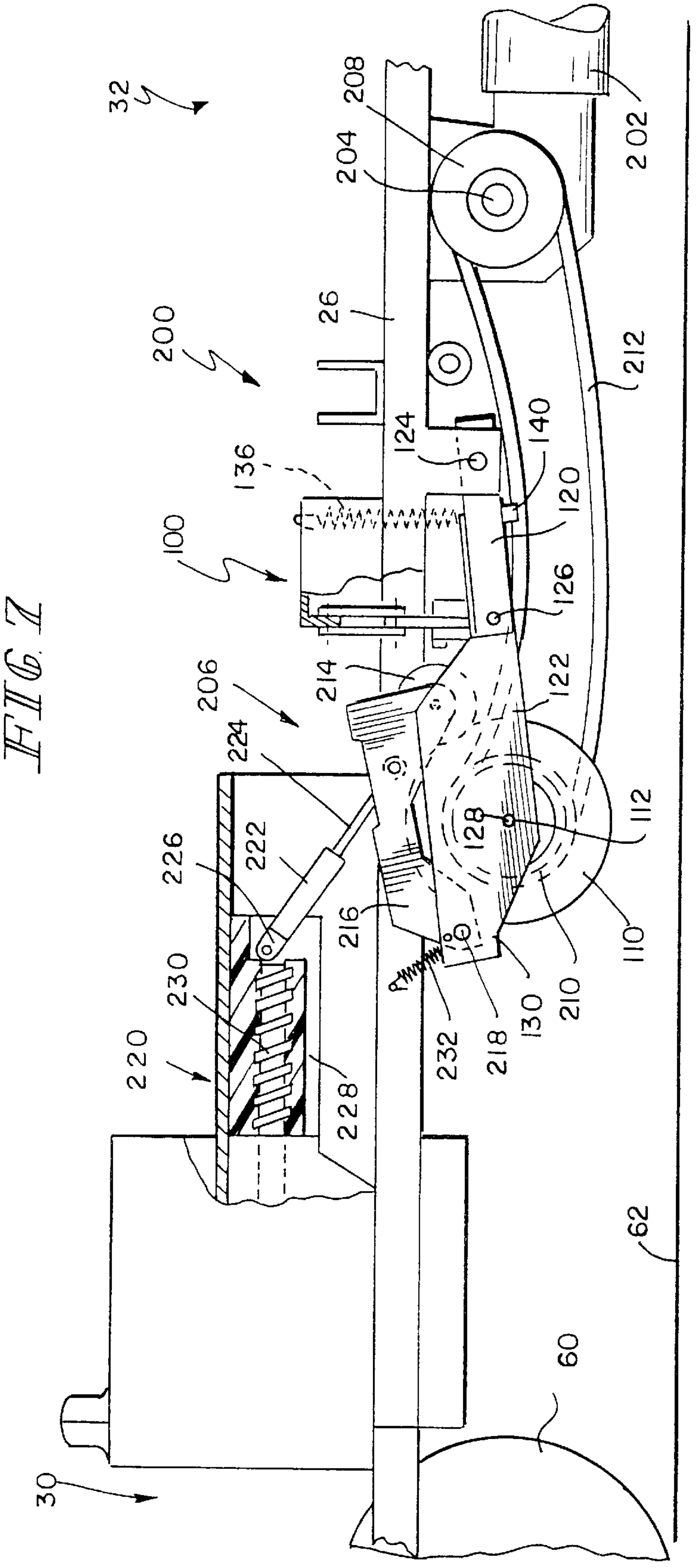
FIG. 7 is a side elevation view corresponding to FIG. 3, showing the linkage assembly in the neutral position with the wheel spaced apart from the floor, and the actuator in the first orientation with the idler spaced apart from the belt to decouple the drive motor from the wheel, and further showing the drive motor mounted on the lower frame, a wheel-mounting bracket supporting the wheel, the belt loosely coupled to the drive motor and the wheel, the idler support bracket carrying the idler pivotally coupled to the wheel-mounting bracket, and the actuator coupled to the idler support bracket.
Figure 8:
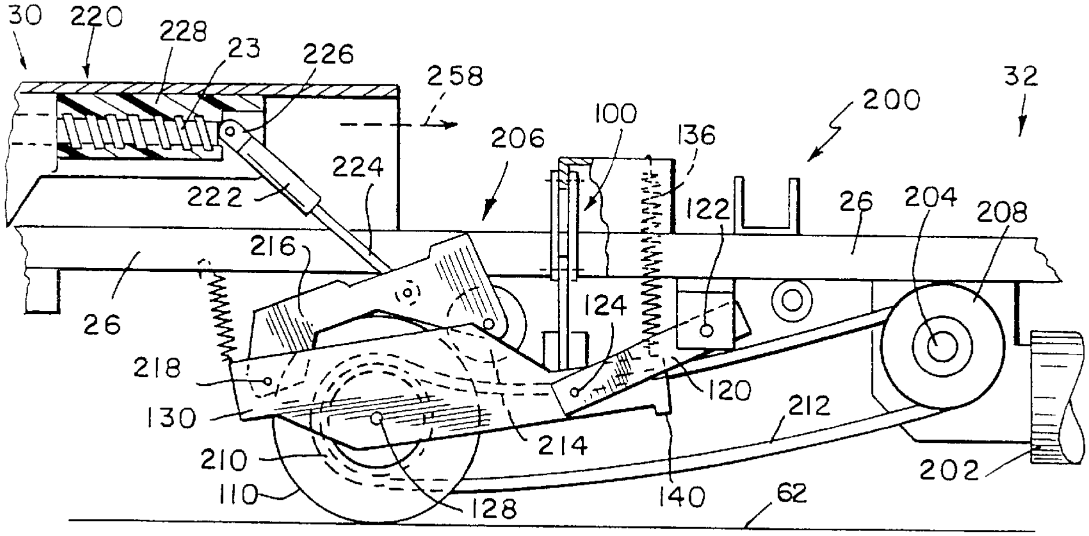
FIG. 8 is a side elevation view corresponding to FIG. 5, showing the linkage assembly in the steer position with the wheel engaging the floor, and the actuator in the first orientation with the idler spaced apart from the belt to decouple the drive motor from the wheel so that the wheel is free to rotate when the stretcher is manually pushed along the floor without hindrance from the drive motor.
Figure 9:
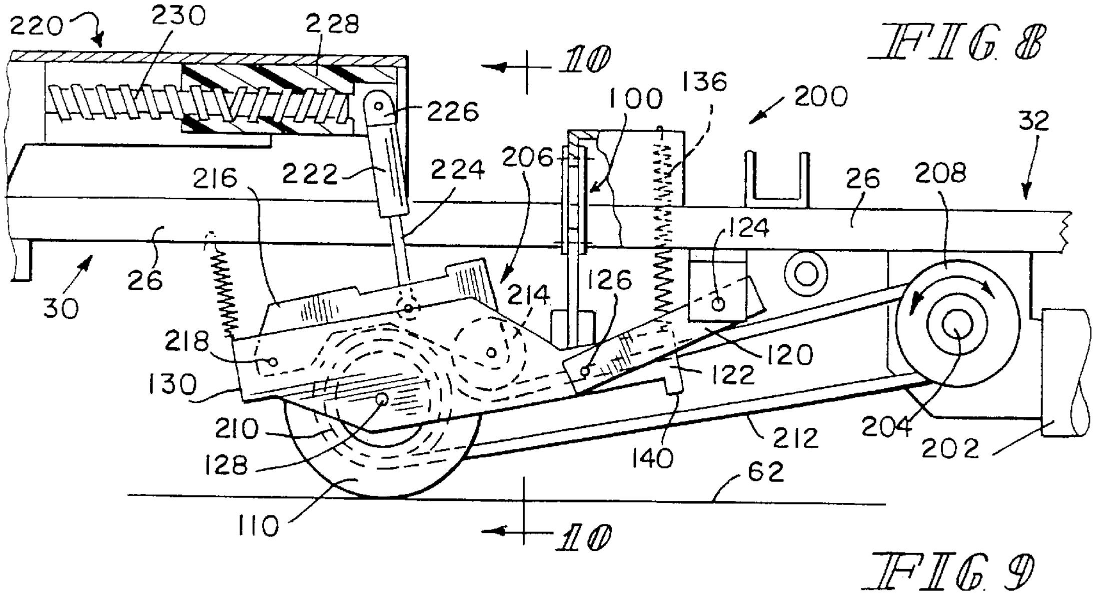
FIG. 9 is a view similar to FIG. 8, showing the linkage assembly in the steer position with the wheel engaging the floor, and the actuator in the second orientation with the idler engaging the belt to tension the belt to propel the stretcher along the floor.
Figure 10:
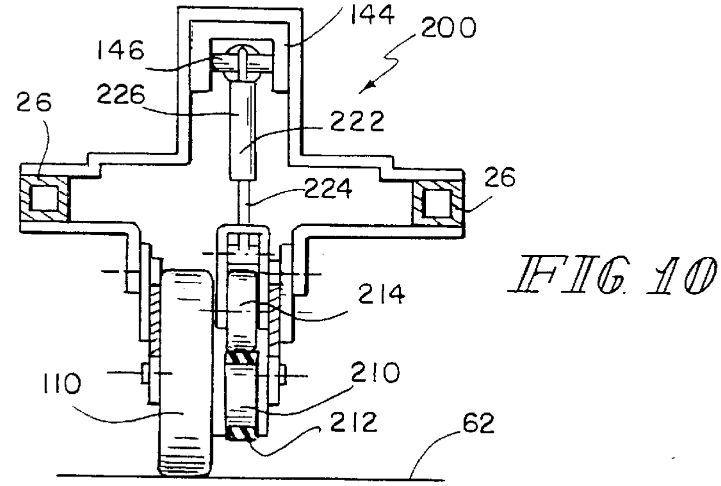
FIG. 10 is a sectional end view taken along line 10—10 in FIG. 9, showing the linkage assembly in the steer position with the wheel engaging the floor and the actuator in the second orientation to couple the drive motor to the wheel to propel the stretcher along the floor.

The construction and operation of a first embodiment of a drive assembly 200 of the present invention will now be described with reference to FIGS. 7–10. The drive assembly 200 includes a variable speed, bidirectional drive motor 202 having a rotatable output shaft 204, and a selectively engagable clutch 206 to selectively couple the drive motor 202 to the wheel 110 when the clutch 206 is engaged. As previously described, the wheel 110 has three positions—(i) a neutral position in which the wheel 110 is raised the first distance above the floor 62 as shown in FIGS. 3 and 7, (ii) a brake position in which the wheel 110 is raised the second higher distance above the floor 62, and (iii) a steer position in which the wheel 110 is engaging the floor 62 as shown in FIGS. 5 and 8–10. When the wheel 110 is engaging the floor 62, the drive assembly 200 has (a) a first, manual drive mode of operation decoupled from the wheel 110 (when the clutch is disengaged as shown in FIGS. 5 and 8) so that the wheel 110 is free to rotate when the stretcher 20 is manually pushed along the floor 62 without hindrance from the drive motor 202, and (b) a second, power drive mode of operation coupled to the wheel 110 (when the clutch is engaged as shown in FIGS. 9 and 10) to drive the wheel 110 to propel the stretcher 20 along the floor 62.

The selectively engagable clutch 206 includes a drive pulley 208 mounted on the rotatable output shaft 204 of the drive motor 202, a driven pulley 210 coaxially mounted on the axle 112 and coupled to the wheel 110, a slipbelt 212 (also referred to herein as belt 212) extending loosely between and around the drive pulley 208 and the driven pulley 210, an idler 214 having a first position (shown in FIGS. 5 and 8) spaced apart from or lightly contacting the belt 212 and a second position (shown in FIGS. 9 and 10) pressed against the belt 212 to put tension in the belt 212, a support bracket 216 pivotally mounted to the head end portion 130 of the wheel-mounting bracket 114 about a pivot pin 218, an actuator 220 mounted to the lower frame 26, and a gas spring 222 having its ends 224 and 226 pivotally coupled to the support bracket 216 and an output member 228 threadably engaging a rotatable output shaft 230 of the actuator 220. The support bracket 216, the actuator 220 and the gas spring 222 are sometimes referred to herein as a second assembly or second linkage assembly.

In the specification and claims, the language "idler 214 is spaced apart from the slipbelt 212" or "idler 214 is lightly contacting the slipbelt 212" is used for convenience only to connote that the slipbelt 212 is not in tension and the drive motor 202 is decoupled from the wheel 110 as shown in FIGS. 5 and 8. Thus, the language "idler 214 is spaced apart from the slipbelt 212" or "idler 214 is lightly contacting the slipbelt 212" is to be construed to mean that the drive motor 202 is decoupled from the wheel 110, and not to be construed to limit the scope of the invention.

In the manual drive mode, when the wheel 110 is engaging the floor 62 and the clutch 206 is disengaged as shown in FIGS. 5 and 8, the support bracket 216 has a first orientation in which the idler 214 is spaced apart from or lightly contacting the belt 212 so that the wheel 110 is free to rotate when the stretcher 20 is manually pushed along the floor 62 without hindrance from the drive motor 202. In the power drive mode, when the wheel 110 is engaging the floor 62 and the clutch 206 is engaged as shown in FIGS. 9 and 10, the support bracket 216 has a second orientation in which the idler 214 is pressed against the belt 212 to transfer rotation from the drive motor 202 to the wheel 110 to propel the stretcher 20 along the floor 62.

A power source, such as a rechargeable battery 242, is inserted into a recessed battery compartment 244 formed in the lower frame 26 as shown in FIG. 1*a* for supplying power to the drive motor 202 and the actuator 220. The battery compartment 244 has terminals 246 for engagement with corresponding terminals 248 on the rechargeable battery 242 when the battery 242 is inserted in the battery compartment 244. A main, on/off power switch 250 is mounted on the lower frame 26 away from the patient support deck 50 for connecting and disconnecting the drive motor 202 and the actuator 220 to and from the battery 242. A limit switch 252 is mounted on the lower frame 26 next to the linkage assembly 100, as shown in FIGS. 4 and 6, for sensing when the wheel 110 is lowered for engaging the floor 62. A rotary switch assembly 254 is coupled to a distal end 86 of the handle post 84 of the first push bar 80 as shown in FIGS. 1 and 11 for controlling the speed and direction of the variable speed, bidirectional drive motor 202.

The stretcher 20 is in the manual drive mode when the wheel 110 is engaging the floor 62, but the main power switch 250 on the lower frame 26 is switched off as shown in FIGS. 5 and 8. In the manual drive mode, the actuator 220 remains inactivated allowing the belt 212 to ride loosely over the drive and driven pulleys 208 and 210 to permit the wheel 110 to rotate freely when the stretcher 20 is manually pushed along the floor 62 without interference from the drive assembly 200.

The stretcher 20 is in the power drive mode when the wheel 110 is engaging the floor 62, and the main power switch 250 on the lower frame 26 is turned on as shown in FIGS. 9 and 10. In the power drive mode, the actuator 220 is activated to press the idler 214 against the belt 212 to couple the drive motor 202 to the wheel 110 to propel the stretcher 20 along the floor 62 in response to the operation of the rotary switch assembly 254 on the handle post 84.

A generally vertically oriented spring 232 (FIGS. 3, 5 and 7) coupled between a head end 30 of the idler support bracket 216 and the lower frame 26 helps to fully lift the linkage assembly 100 off the floor 62 when in neutral or brake positions. Alternatively, the vertically oriented spring 232 may be coupled between a head end 30 of the wheel-mounting bracket 114 and the lower frame 26. Guide rollers (not shown) are provided to prevent the belt 212 from slipping off the drive and driven pulleys 208 and 210.

When the actuator 220 is activated to press the idler 214 against the belt 212, the gas spring 222 is compressed as shown in FIGS. 9 and 10 to provide additional downward biasing force between the wheel 110 and the floor 62. Illustratively, the additional downward biasing force exerted by the compressed gas spring 222 is between seventy five pounds and one hundred pounds.

Figure 14:
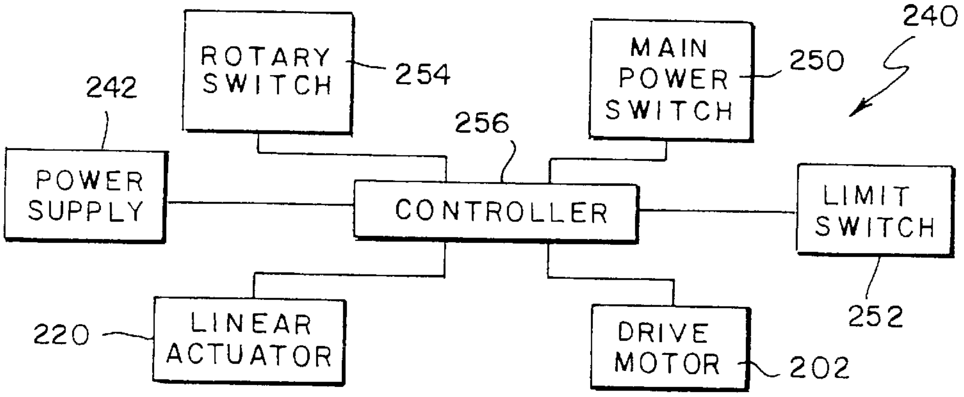
FIG. 14 is a block diagram, schematically showing the electrical components of the drive assembly.

FIG. 14 schematically shows the electrical system 240 for the drive assembly 200. The limit switch 252 senses when the wheel 110 is lowered for engaging the floor 62, and provides an input signal to a controller 256. The controller 256 activates the actuator 220 when the main power switch 250 is turned on and the limit switch 252 senses that the wheel 110 is engaging the floor 62. When the actuator 220 is turned on, the output member 228 of the actuator 220 is translated in the direction of arrow 258 (shown in FIG. 8) to cause the support bracket 216 to pivot clockwise about the pivot pin 218 to press the idler 214 against the belt 212 as shown in FIG. 9 to transfer rotation from the drive motor 202 to the wheel 110. The drive motor 202 then propels the stretcher 20 along the floor 62 in response to the operation of the rotary switch assembly 254. The rotary switch assembly 254 is rotated to a forward position for forward motion of the stretcher 20 and is rotated to a reverse position for reverse motion of the stretcher 20. The speed of the variable speed drive motor 202 is determined by the extent of rotation of the rotary switch assembly 254.

Figure 12:
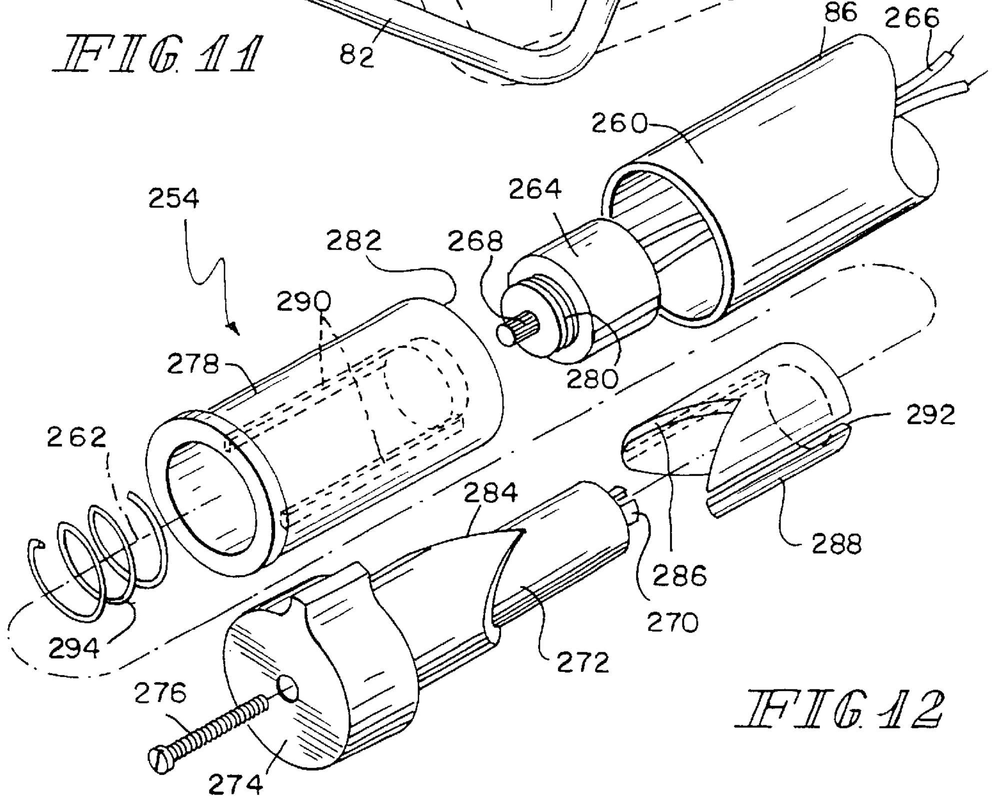
FIG. 12 is an exploded perspective view of the rotary switch of FIG. 11 coupled to the distal end of the handle post of the first push bar.
Figure 13:
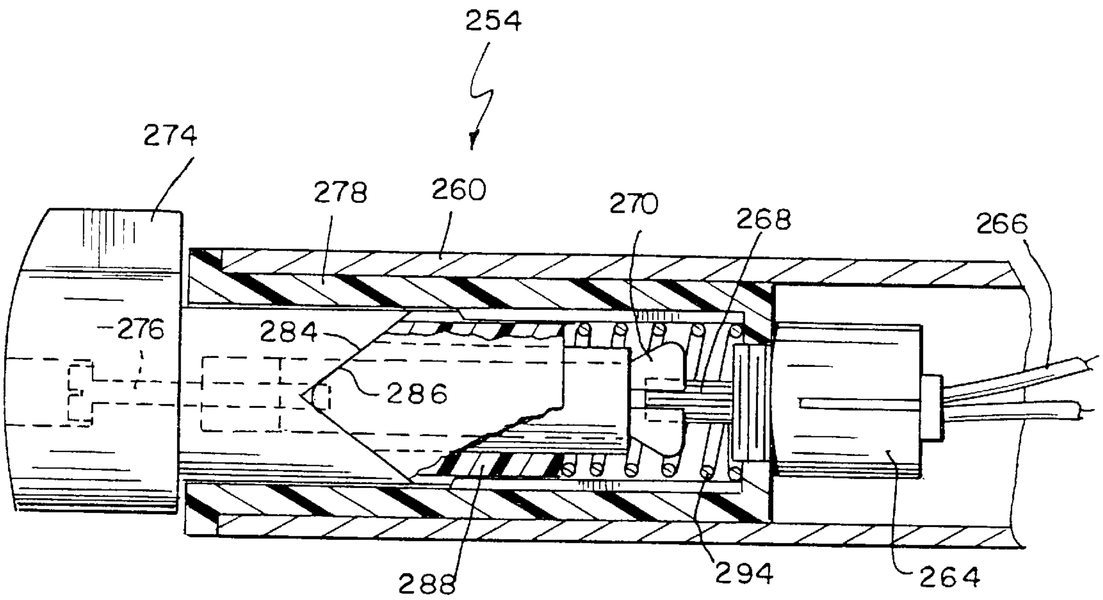
FIG. 13 is a sectional view of the rotary switch of FIGS. 11 and 12.

The rotary switch assembly 254 coupled to the distal end 86 of the handle post 84 will now be described with reference to FIGS. 12 and 13. FIG. 12 is an exploded perspective view of the rotary switch assembly 254, and FIG. 13 is a sectional view of the rotary switch assembly 254. The distal end 86 of the handle post 84 includes a generally cylindrical hollow tube 260 defining an axis 262. The rotary switch assembly 254 includes a bidirectional rotary switch 264 positioned inside the hollow tube 260 to rotate about the axis 262. Control wires 266 of the rotary switch 264 are routed through the hollow tube 260 for connection to the controller 256. The rotary switch 264 includes an input shaft 268 which is configured to be inserted into a chuck 270 coupled to an inner end of a control shaft 272. A thumb wheel 274 is coupled to an outer end of the chuck 270 by a set screw 276. The control shaft 272 is inserted into an outer sleeve 278 through an outer end thereof. The rotary switch 264 includes a threaded portion 280 that is screwed into a flange portion 282 formed at an inner end of the outer sleeve 278. The outer sleeve 278 is configured to be press fitted into the hollow tube 260 formed at the distal end 86 of the handle post 84 as shown in FIG. 13.

The rotary switch assembly 254 is biased toward a neutral position between the forward and reverse positions thereof. To this end, the control shaft 272 is formed to include wedge-shaped camming surfaces 284 which are configured to cooperate with corresponding, notch-shaped camming surfaces 286 formed in an inner sleeve 288 slidably received in the outer sleeve 278. The inside surface of the outer sleeve 278 is formed to include raised guide portions 290 which are configured to be received in corresponding guide grooves 292 formed on the outer surface of the inner sleeve 288. The reception of the guide portions 290 of the outer sleeve 278 in the corresponding guide grooves 292 in the inner sleeve 288 allows the inner sleeve 288 to slide inside the outer sleeve 278, while preventing rotation of the inner sleeve 288 relative to the outer sleeve 278. A spring 294 is disposed between the inner sleeve 288 and the flange portion 282 of the outer sleeve 278. The spring 294 biases the camming surfaces 286 of the inner sleeve 288 into engagement with the camming surfaces 284 of the control shaft 272 to, in turn, bias the thumb wheel 274 to automatically return to a neutral position thereof when released.

Thus, the thumb wheel 274 is movable to a forward position in which the drive assembly 200 operates to drive the wheel 110 in a forward direction to propel the stretcher 20 in the forward direction, and the thumb wheel 274 is movable to a reverse position in which the drive assembly 200 operates to drive the wheel 110 in a reverse direction to propel the stretcher 20 in the reverse direction. The handle post 84 may be marked with an indicia to provide a visual indication of the neutral position of the thumb wheel 274.

Illustratively, the drive motor 202 is Model No. M6030/G33, manufactured by Rae Corporation, the linear actuator 220 is Model No. LA22.1-130-24-01, manufactured by Linak Corporation, and the rotary switch 264 is Model No. RV6N502C-ND, manufactured by Precision Corporation.

Figure 15:
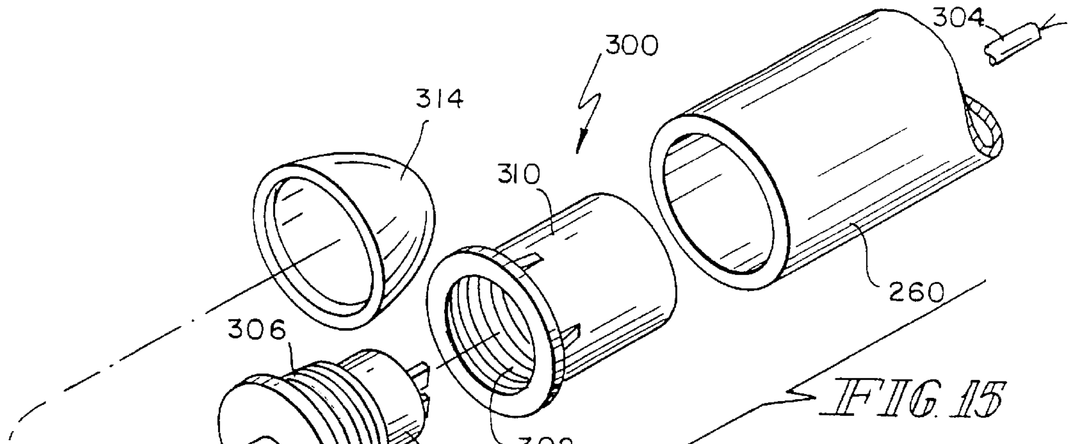
FIG. 15 is an exploded perspective view of an alternative push-type switch assembly configured to be coupled to the distal end of the handle post of the first push bar for operating the drive assembly, the push-type switch assembly including a pressure sensitive switch configured to be positioned inside the handle post and a flexible dome-shaped cap configured to be coupled to an input shaft of the pressure sensitive switch.
Figure 15A:
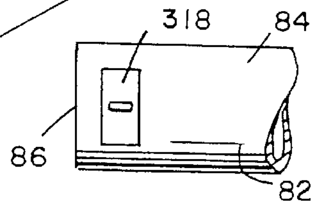
FIG. 15*a* is a view showing a forward/reverse switch configured to be coupled to a distal end of the handle post of the second push bar.
Figure 16:
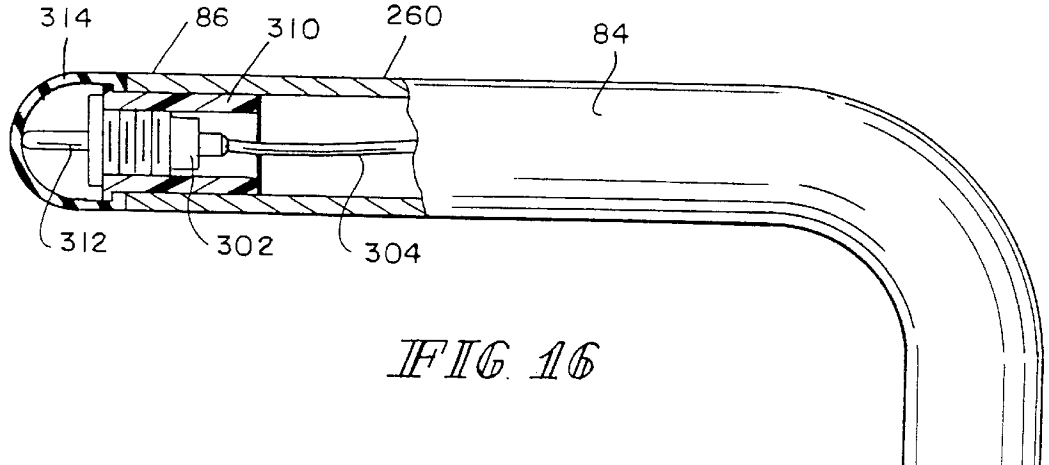
FIG. 16 is a sectional view of the push-type switch assembly of FIG. 15 coupled to the distal end of the handle post of the first push bar.
Figure 17:
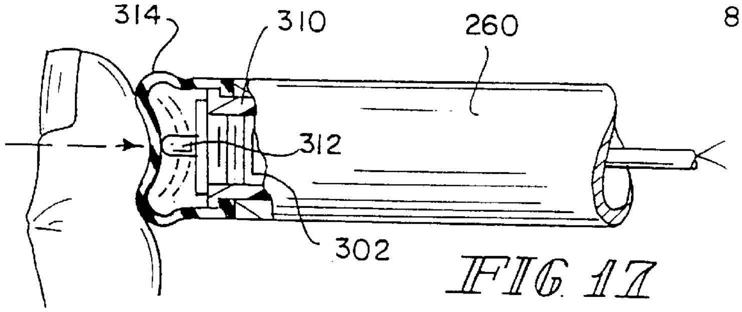
FIG. 17 is a sectional view similar to FIG. 16, showing the flexible dome-shaped cap of the push-type switch assembly pressed to push the input shaft of the pressure sensitive switch.

FIGS. 15–17 show an alternative push-type switch assembly 300 for operating the drive motor 202. The push-type switch assembly 300 is coupled to the distal end 86 of the handle post 84 of the first push bar 80. The push-type switch assembly 300 includes a pressure sensitive, push-type switch 302 positioned inside the hollow tube 260 formed at the distal end 86 of the handle post 84. Control cables 304 of the push-type switch 302 are routed through the hollow tube 260 for connection to the controller 256. The push-type switch 302 includes a threaded portion 306 that is screwed into a threaded portion 308 formed on the inside surface of an outer sleeve 310. The outer sleeve 310 is configured to be press fitted into the hollow tube 260 of the handle post 84 as shown in FIGS. 16 and 17. The push-type switch 302 includes an input shaft 312 which is configured to be in engagement with a flexible dome-shaped cap 314. The flexible dome-shaped cap 314 is snap fitted over a flange portion 316 of the outer sleeve 310. The farther the input shaft 312 on the push-type switch 302 is pushed, the faster the drive motor 202 runs. A forward/reverse toggle switch 318 is mounted near a distal end 86 of the second push bar 82 to change the direction of the drive motor 202 as shown in FIG. 15*a*. Alternatively, the forward/reverse toggle switch 318 may be located at some other location—for example, the lower frame 26.

Thus, the forward/reverse toggle switch 318 is moved to a forward position in which the drive motor 202 operates to drive the wheel 110 in a forward direction to propel the stretcher 20 in the forward direction, and the forward/reverse toggle switch 318 is moved to a reverse position in which the drive motor 202 operates to drive the wheel 110 in a reverse direction to propel the stretcher 20 in the reverse direction. The speed of the drive motor 202, on the other hand, is determined by the extent to which the push-type switch 302 is pushed. Illustratively, the push-type switch 302 is of the type sold by Duncan Corporation.

Figure 18:
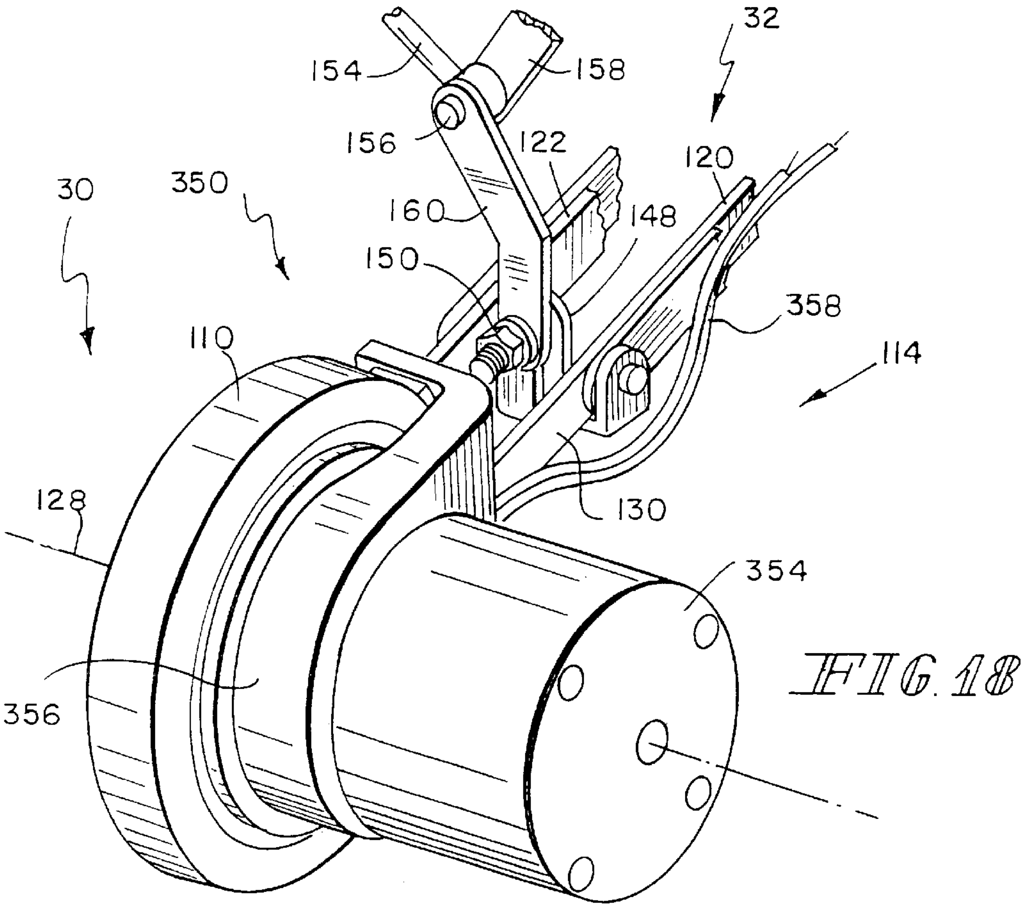
FIG. 18 is a perspective view of an alternative embodiment of the drive assembly drivingly couplable to a floor-engaging wheel for propelling the stretcher along the floor, and showing the wheel mounted directly on an output shaft of a drive motor coupled to the wheel-mounting bracket.
Figure 19:
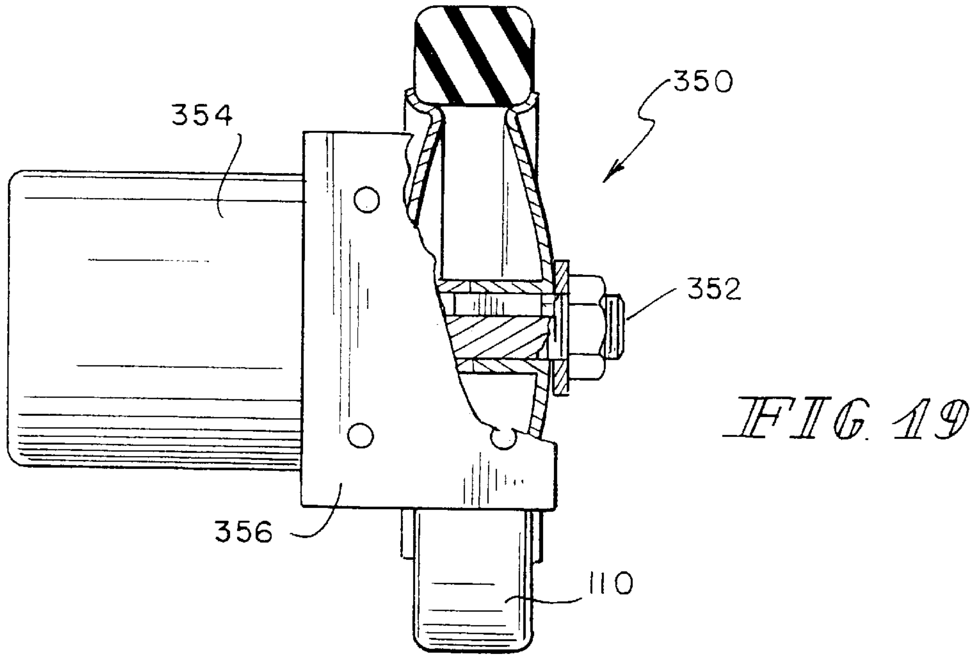
FIG. 19 is a sectional view of the drive motor and the wheel of FIG. 18 through the central axis of the motor output shaft.

FIGS. 18 and 19 show an alternative configuration of the drive assembly 350 drivingly couplable to the wheel 110 for propelling the stretcher 20 along the floor 62. As shown therein, the wheel 110 is mounted directly on an output shaft 352 of a drive motor 354. The drive motor 354 is, in turn, mounted to a bracket 356 coupled to the wheel-mounting bracket 114. Control cables 358 of the drive motor 354 are routed to the controller 256 along the wheel-mounting bracket 114. Illustratively, the drive motor 354 is of the type sold by Rockland Corporation.

Figure 20:
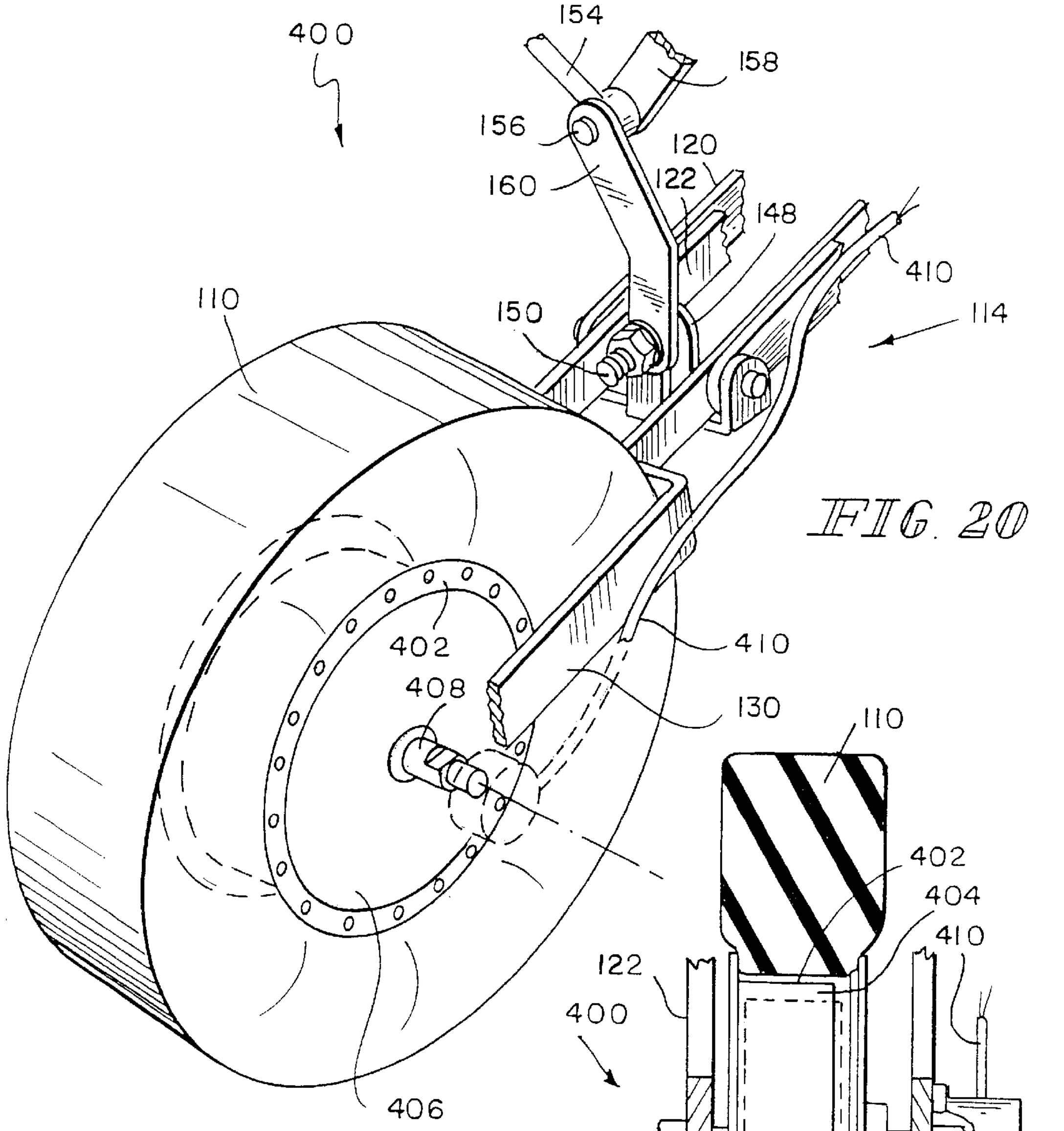
FIG. 20 is a perspective view of another alternative embodiment of the drive assembly drivingly couplable to a floor-engaging wheel for propelling the stretcher along the floor, showing the wheel mounted directly on a rim portion of a rotor of a drive motor, and further showing a stationary shaft of a stator of the drive motor fixed to the wheel-mounting bracket.
Figure 21:
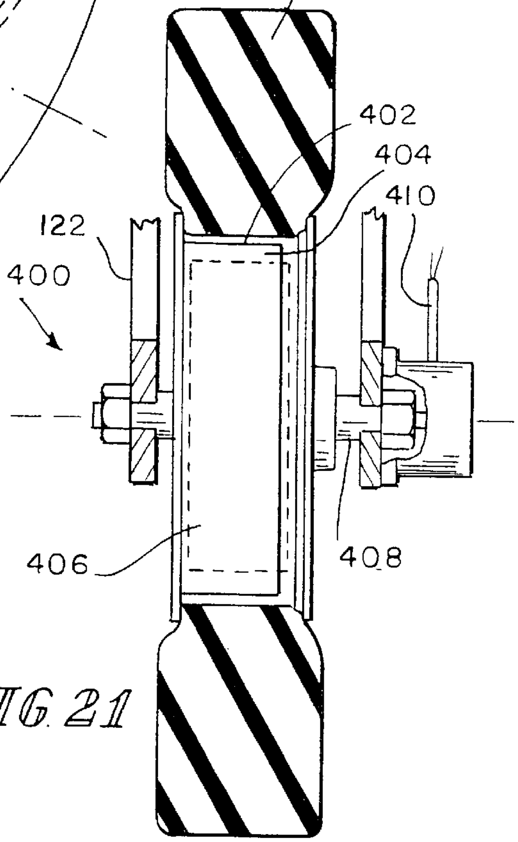
FIG. 21 is a sectional view of the drive motor and the wheel of FIG. 20 through the central axis of the stationary stator shaft.

FIGS. 19 and 20 show another alternative configuration of the drive assembly 400 drivingly couplable to the wheel 110 for propelling the stretcher 20 along the floor 62. As shown therein, the wheel 110 is mounted directly on a rim portion 402 of a rotor 404 of a hub-type drive motor 406. The stationary stator shaft 408 of the hub-type drive motor 406 is coupled to the wheel-mounting bracket 114. Control cables 410 of the drive motor 406 are routed to the controller 256 along the wheel-mounting bracket 114. Illustratively, the hub-type drive motor 406 is Model No. 80-200-48-850, manufactured by PML Manufacturing Company.

Although the invention has been described in detail with reference to a certain preferred embodiment, variations and modifications exist within the scope and spirit of the invention as described and as defined in the following claims.

What is claimed is:

1. A patient support apparatus for transporting a patient along a floor, the patient support apparatus comprising a frame, a plurality of casters coupled to the frame and engaging the floor, a wheel movable relative to the frame between a first position engaging the floor and a second position spaced apart from the floor, a drive assembly coupled to the wheel and operable to drive the wheel to propel the patient support apparatus along the floor, a push handle coupled to the frame, and a switch assembly coupled to the push handle, the switch assembly having a user-engageable portion that is engaged to operate the drive assembly, the push handle being movable between a use position and a storage position, wherein the user-engageable portion comprises a rotatable member, the push handle has a handle post that defines an axis, and the rotatable member rotates about the axis.

2. The patient support apparatus of claim 1, wherein a speed at which the patient support apparatus is propelled depends upon an amount that the rotatable member is rotated away from a neutral position.

3. The patient support apparatus of claim 1, wherein the push handle extends from the frame and terminates at a distal end and the rotatable member is coupled to the distal end of the push handle.

4. A patient support apparatus for transporting a patient along a floor, the patient support apparatus comprising a frame, a plurality of casters coupled to the frame and engaging the floor, a wheel coupled to the frame and engaging the floor, a drive assembly coupled to the wheel and operable to drive the wheel to propel the patient support apparatus along the floor, a push handle coupled to the frame, and a switch assembly coupled to the push handle, the switch assembly having a user-engageable portion that is engaged to operate the drive assembly, the push handle being movable between a use position and a storage position, wherein the user-engageable portion comprises a rotatable member, the push handle has a handle post that defines an axis, and the rotatable member rotates about the axis, and wherein the rotatable member is rotated from a neutral position in a forward direction to operate the drive assembly to propel the patient support apparatus forwardly and the rotatable member is rotated from the neutral position in a rearward direction to operate the drive assembly to propel the patient support apparatus rearwardly.

5. A patient support apparatus for transporting a patient along a floor, the patient support apparatus comprising a frame, a plurality of casters coupled to the frame and engaging the floor, a wheel coupled to the frame and engaging the floor, a drive assembly coupled to the wheel and operable to drive the wheel to propel the patient support apparatus along the floor, a push handle coupled to the frame, and a switch assembly coupled to the push handle, the switch assembly having a user-engageable portion that is engaged to operate the drive assembly, the push handle being movable between a use position and a storage position, the user-engageable portion comprising a rotatable member, the push handle having a handle post that defines an axis, and the rotatable member being rotatable about the axis, and a mattress supported by the frame, the mattress having an upwardly facing patient support surface, the rotatable member being positioned higher in elevation than the patient support surface when the push handle is in the use position, and the rotatable member being positioned lower in elevation than the patient support surface when the push handle is in the storage position.

6. A patient support apparatus for transporting a patient along a floor, the patient support apparatus comprising a frame, a plurality of casters coupled to the frame and engaging the floor, a wheel coupled to the frame and engaging the floor, a drive assembly coupled to the wheel and operable to drive the wheel to propel the patient support apparatus along the floor, a push handle coupled to the frame, and a switch assembly coupled to the push handle, the switch assembly having a user-engageable portion that is engaged to operate the drive assembly, the push handle being movable between a use position and a storage position, wherein the user-engageable portion comprises a pressure sensitive switch that is engaged to operate the drive assembly, the push handle has a handle post that defines an axis and the pressure sensitive switch has a member that moves along the axis.

7. A patient support apparatus for transporting a patient along a floor, the patient support apparatus comprising a frame, a plurality of casters coupled to the frame and engaging the floor, a wheel coupled to the frame and engaging the floor, a drive assembly coupled to the wheel and operable to drive the wheel to propel the patient support apparatus along the floor, a push handle coupled to the frame, and a switch assembly coupled to the push handle, the switch assembly having a user-engageable portion that is engaged to operate the drive assembly, the push handle being movable between a use position and a storage position, wherein the user-engageable portion comprises a rotatable member, the push handle has a handle post that defines an axis, and the rotatable member rotates about the axis, wherein the push handle comprises a hollow tube and the switch assembly includes at least one control wire routed from the user-engageable portion through the hollow tube.

8. A patient support apparatus for transporting a patient along a floor, the patient support apparatus comprising a frame, a plurality of casters coupled to the frame and engaging the floor, a wheel movable relative to the frame between a first position engaging the floor and a second position spaced apart from the floor, a drive assembly coupled to the wheel and operable to drive the wheel to propel the patient support apparatus along the floor, and an electrical system having a controller, a limit switch that provides a signal to the controller to indicate whether the wheel is in the first position or the second position, a main power switch that is movable between an on position and an off position, and a switch assembly coupled to the controller, the switch assembly having a user-engageable portion that is engaged to operate the drive assembly, the controller being configured to prevent the drive assembly from driving the wheel unless (i) the wheel is in the first position, (ii) the main power switch is in the on position, and (iii) the user-engageable portion is engaged by a user.

9. The patient support apparatus of claim 8, further comprising a linkage assembly coupling the wheel to the frame and the linkage assembly being operated manually to move the wheel between the first and second positions.

10. The patient support apparatus of claim 9, wherein the linkage assembly engages the limit switch when the wheel is engaging the floor and the linkage assembly disengages from the limit switch when the wheel is spaced apart from the floor.

11. The patient support apparatus of claim 8, wherein the frame includes a lower frame and an upper frame, the casters and wheel are coupled to the lower frame, the upper frame is movable relative to the lower frame, the user-engageable portion is coupled to the upper frame, and the main power switch is coupled to the lower frame.

12. The patient support apparatus of claim 8, wherein lower frame is formed to include a compartment and the electrical system includes a battery that is insertable into the compartment.

13. A patient support apparatus for transporting a patient along a floor, the patient support apparatus comprising a frame, a plurality of casters coupled to the frame and engaging the floor, a wheel coupled to the frame and engaging the floor, a drive assembly coupled to the wheel, the drive assembly being operable in a forward mode to drive the wheel to propel the patient support apparatus in a forward direction along the floor, the drive assembly being operable in a reverse mode to drive the wheel to propel the patient support apparatus in a reverse direction along the floor, a first push handle and a second push handle, the first and second push handles being coupled to the frame, each of the first and second push handles being movable between a respective use position and a respective storage position, and a switch assembly coupled to the first push handle, the switch assembly having a user-engageable portion that is movable to propel the patient support apparatus in the forward direction when the drive assembly operates in the forward mode and that is movable to propel the patient support apparatus in the reverse direction when the drive assembly operates in the reverse mode.

14. The patient support apparatus of claim 13, wherein the user-engageable portion comprises a rotatable member that is rotated in a forward direction to operate the drive assembly in the forward mode and that is rotated in a reverse direction to operate the drive assembly in the reverse mode.

15. The patient support apparatus of claim 14, wherein a speed at which the patient support apparatus is propelled depends upon an amount that the rotatable member is rotated.

16. The patient support apparatus of claim 13, wherein the user-engageable portion comprises a pressure sensitive switch that is engaged to operate the drive assembly.

17. The patient support apparatus of claim 16, further comprising a toggle switch mounted to the second push handle, the toggle switch having a first position in which the drive assembly is operable in the forward mode, and the toggle switch having a second position in which the drive assembly is operable in the reverse mode.

18. A patient support apparatus for transporting a patient along a floor, the patient support apparatus comprising a frame, a plurality of casters coupled to the frame and engaging the floor, a wheel coupled to the frame and engaging the floor, a drive assembly coupled to the wheel and operable to drive the wheel to propel the patient support apparatus along the floor, a push handle coupled to the frame and movable between a push position and a storage position, the push handle having a handle post that defines an axis, and a switch assembly coupled to the push handle, the switch assembly having a user-engageable portion comprising a thumb-activated rotatable member that is rotated about the axis of the handle post to operate the drive assembly.

19. The patient support apparatus of claim 18, wherein the thumb-activated rotatable member includes an axially-extending portion that is engagable by a user's thumb to operate the drive assembly.

* * * * *

UNITED STATES PATENT AND TRADEMARK OFFICE

CERTIFICATE OF CORRECTION

PATENT NO. : 6,588,523 B2
APPLICATION NO. : 10/022552
DATED : July 8, 2003
INVENTOR(S) : Heimbrock et al.

It is certified that error appears in the above-identified patent and that said Letters Patent is hereby corrected as shown below:

Title page, item (75) Inventors: replace "Matt Webster" with --Thomas M. Webster--.

Signed and Sealed this
Nineteenth Day of April, 2011

David J. Kappos
*Director of the United States Patent and Trademark Office*